US009293979B2

(12) United States Patent
Usami

(10) Patent No.: US 9,293,979 B2
(45) Date of Patent: Mar. 22, 2016

(54) POWER CONVERSION APPARATUS FOR CONVERTING AN ALTERNATING CURRENT VOLTAGE TO A DIRECT CURRENT VOLTAGE

(71) Applicant: TOSHIBA TEC KABUSHIKI KAISHA, Shinagawa-ku, Tokyo (JP)

(72) Inventor: Yutaka Usami, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 28 days.

(21) Appl. No.: 14/450,372

(22) Filed: Aug. 4, 2014

(65) Prior Publication Data

US 2015/0043258 A1 Feb. 12, 2015

(30) Foreign Application Priority Data

Aug. 8, 2013 (JP) .................................. 2013-165469

(51) Int. Cl.
| | |
|---|---|
| H02M 7/08 | (2006.01) |
| H02M 1/12 | (2006.01) |
| H02M 7/217 | (2006.01) |
| H02M 7/538 | (2007.01) |

(52) U.S. Cl.
CPC ............ *H02M 1/12* (2013.01); *H02M 7/53803* (2013.01)

(58) Field of Classification Search
CPC ................................ H02M 1/12; H02M 7/217
See application file for complete search history.

(56) References Cited

U.S. PATENT DOCUMENTS

| | | | | |
|---|---|---|---|---|
| 4,933,831 A * | 6/1990 | Takahashi | ............ | H02M 1/4208 363/124 |
| 5,063,490 A * | 11/1991 | Maehara | ............... | H05B 41/392 315/105 |
| 5,777,861 A * | 7/1998 | Shimizu | ............... | H02M 1/4208 315/209 R |
| 6,570,778 B2 * | 5/2003 | Lipo | ..................... | H02P 27/042 318/807 |
| 7,768,227 B2 * | 8/2010 | Vaez-Zadeh | ............ | H02P 25/04 318/701 |
| 8,093,858 B1 | 1/2012 | Kadah et al. | | |

FOREIGN PATENT DOCUMENTS

| | | |
|---|---|---|
| JP | 10-106786 | 4/1998 |
| JP | 10-285933 | 10/1998 |
| JP | 2012-222852 | 11/2012 |

OTHER PUBLICATIONS

First Office Action for Japanese Patent Application No. 2013-165469 dated Jun. 9, 2015, 4 pages.

* cited by examiner

*Primary Examiner* — Emily P Pham
(74) *Attorney, Agent, or Firm* — Amin, Turocy & Watson, LLP

(57) ABSTRACT

A controller outputs pulse signals to a first switch and a second switch based on a circuit current flowing through a power conversion circuit and a voltage of an AC power supply. The first switch is opened and closed alternately to the second switch. According to the opening and closing, a current in which a high frequency component is mixed with a low frequency component of the AC power supply flows through the power conversion circuit.

6 Claims, 17 Drawing Sheets

POWER CONVERSION APPARATUS FOR CONVERTING AN ALTERNATING CURRENT VOLTAGE TO A DIRECT CURRENT VOLTAGE

CROSS-REFERENCE TO RELATED APPLICATION

This application is based upon and claims the benefit of priority from Japanese Patent Application No. 2013-165469, filed Aug. 8, 2013, the entire contents of which are incorporated herein by reference.

FIELD

Embodiments described herein relate generally to a power conversion apparatus that converts an alternating current voltage obtained from an AC power supply to a direct current voltage and supplies the electric power to a load.

BACKGROUND

In the related art, as a method of converting the alternating current voltage to the direct current voltage, two following methods are generally known.

The first method uses a diode bridge circuit and a smoothing capacitor. The diode bridge circuit performs full wave rectification on the alternating current from the AC power supply. The smoothing capacitor smoothes the direct current after the full wave rectification.

In the first method, even if the alternating current voltage is either positive or negative, the current always flows through a series circuit of two diodes. At this point, in two diodes, the electric power corresponding to the product of the current flowing through the diode and the voltage in a forward direction of the diode is lost.

In the second method, a power factor improvement converter (PFC) is interposed between the diode bridge circuit and the smoothing capacitor in the first method. The power factor improvement converter boosts the voltage of the direct current subjected to the full wave rectification in the diode bridge circuit.

In the second method, since the current flows through a series circuit of two diodes at the time of the full wave rectification, the electric power is also lost. In addition, since the current flows alternately through a field effect transistor (FET) configuring the power factor improvement converter and the diode, the electric power is further lost.

Additionally, in order to cause the waveform of the input current to be a sine wave, the power factor improvement converter is required to set the output voltage to be higher than the input voltage. However, the exemplary embodiments are not limited to the configuration in which the voltage required in the load is necessarily higher than the input voltage. In this case, a step-down converter is connected to the downstream of the power factor improvement converter. Then, the voltage boosted by the power factor improvement converter is stepped-down to a desired voltage. When stepping-down, the electric power is also lost. The entire power conversion apparatus has a three-stage configuration of the AC-DC conversion, the DC-DC (step-up) conversion, the DC-DC (step-down) conversion, and the electric power loss is shown as the product of these conversions. For example, if the efficiency for one stage is 0.95, the efficiency for three stages is 0.95×0.95×0.95=0.86. That is, even in the prominent conversion having 95% efficiency, the efficiency falls to 86% in a three-stage connection. In this manner, even if each of the conversion efficiencies is good, the conversion efficiency remarkably deteriorates by setting the conversion to be multi stage.

Recently, the public demand for power saving properties of electric apparatus is increased. At the same time, it is essential not to produce current harmonic noises so as not to negatively influence the external environment. Therefore, the compatibility of the conversion efficiency enhancement and the current harmonics suppressing function in the power conversion apparatus that supplies the electric power to the load is demanded.

JP-A-2007-110869 and JP-A-2008-295248 are examples of the related art.

DETAILED DESCRIPTION

An object of the embodiments is to achieve the compatibility of the conversion efficiency enhancement and the current harmonics suppressing function in the power conversion apparatus that supplies the electric power to the load.

According to an aspect of the embodiment, a power conversion apparatus includes a power conversion circuit, a circuit current detection portion, a supply voltage detection portion, and a control portion.

The power conversion circuit includes a path configured to form a closed loop by connecting a first switch and a second switch in series, connecting a first capacitor and a second capacitor in series, connecting the first switch and the second switch respectively to the first capacitor and the second capacitor, to connect a connection point between the first switch and the second switch and a connection point between the first capacitor and the second capacitor through a series circuit of an AC power supply, a low pass filter, an inductor, and a load, and to bypass the AC power supply and the low pass filter.

The circuit current detection portion detects a circuit current that flows through the power conversion circuit.

The supply voltage detection portion detects a voltage of the AC power supply.

The control portion outputs pulse signals for alternately opening and closing the first switch and the second switch to the first switch and the second switch based on the circuit current detected by the circuit current detection portion and a supply voltage detected by the supply voltage detection portion so that a current in which a high frequency component is mixed with a low frequency component of the AC power supply flows through the power conversion circuit.

Hereinafter, embodiments of a power conversion apparatus are described with reference to the drawings.

First Embodiment

Figure 1:
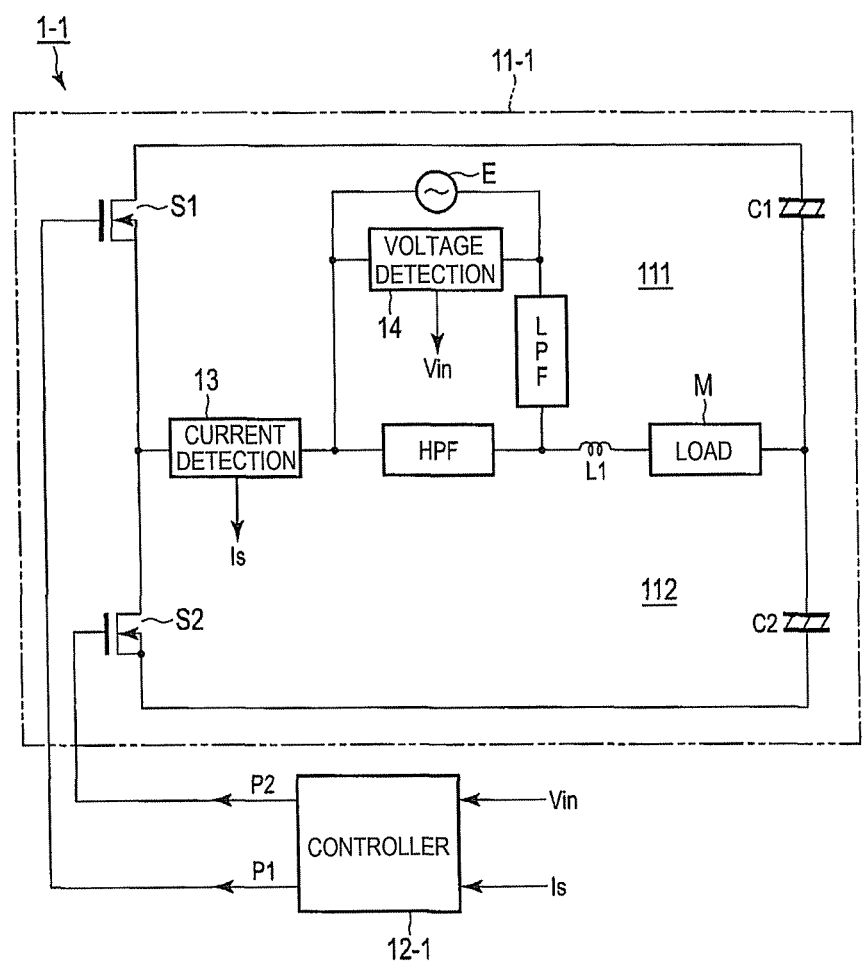
FIG. 1 is a diagram illustrating a configuration of a circuit of a power conversion apparatus according to a first embodiment.

FIG. 1 is a diagram illustrating a configuration of a circuit of a power conversion apparatus 1-1 according to a first embodiment. The power conversion apparatus 1-1 includes a power conversion circuit 11-1 and a controller (control portion) 12-1 thereof.

The power conversion circuit 11-1 includes first and second semiconductor switches (hereinafter, simply referred to as switches) S1 and S2, first and second smoothing capacitors (hereinafter, simply referred to as capacitors) C1 and C2, an inductor L1, a low pass filter LPF, and a high pass filter HPF. The first and second switches S1 and S2 all use N-channel MOS field effect transistors (MOSFET).

In the power conversion circuit 11-1, a source terminal of the first switch S1 is connected to a drain terminal of the second switch S2. Additionally, the first capacitor C1 and the second capacitor C2 are connected in series. Further, a terminal of the first capacitor C1 which is not connected to the second capacitor C2 is connected to a drain terminal of the first switch S1, and a terminal of the second capacitor C2 which is not connected to the first capacitor C1 is connected to a source terminal of the second switch S2.

In the power conversion circuit 11-1, an AC power supply E is connected to a connection point between the first switch S1 and the second switch S2, and the low pass filter LPF is connected to the AC power supply E in series. Further, a load M is connected to the low pass filter LPF in series, and the load M is connected to the connection point between the first capacitor C1 and the second capacitor C2. Additionally, in the power conversion circuit 11-1, a high pass filter HPF is connected to a series circuit between the AC power supply E and the low pass filter LPF in parallel.

Therefore, the power conversion circuit 11-1 forms a first closed loop circuit 111 including the parallel circuit between the high pass filter HPF and the series circuit between the AC power supply E and the low pass filter LPF, the inductor L1, the load M, the first capacitor C1, and the first switch S1, and a second closed loop circuit 112 including the parallel circuit, the inductor L1, the load M, the second capacitor C2, and the second switch S2.

The power conversion apparatus 1-1 includes a circuit current detection unit (circuit current detection portion) 13 that detects a circuit current Is of the power conversion circuit 11-1, and a supply voltage detection unit (supply voltage detection portion) 14 that detects a supply voltage Vin of the power conversion circuit 11-1. The circuit current detection unit 13 is interposed between the connection point between the first switch S1 and the second switch S2 and the connection point between the AC power supply E and the high pass filter HPF, and detects the circuit current Is that flows through the first and second closed loop circuits 111 and 112. The supply voltage detection unit 14 is connected to the AC power supply E in parallel, and detects the voltage yin of the AC power supply E.

The circuit current detection unit 13 provides the detected circuit current Is to the controller 12-1. The supply voltage detection unit 14 also provides the detected supply voltage Vin to the controller 12-1.

The controller 12-1 generates first and second pulse signals P1 and P2 for causing the first switch S1 and the second switch S2 to perform switching operations, based on the circuit current Is and the supply voltage Vin. Then, the controller 12-1 supplies the first pulse signal P1 to a gate terminal of the first switch S1, and the second pulse signal P2 to a gate terminal of the second switch S2.

The first switch S1 is conducted while the first pulse signal P1 is supplied to the gate terminal. If the first switch S1 is conducted, the circuit current Is flows through the first closed loop circuit 111. The second switch S2 is conducted while the second pulse signal P2 is supplied through the gate terminal. If the second switch S2 is conducted, the circuit current Is flows through the second closed loop circuit 112.

According to the embodiment, the commercial power supply of 100 V [Volt]/50 Hz [Hertz] is used as the AC power supply E. Then, the controller 12-1 generates the first pulse signal P1 and the second pulse signal P2 so that a high frequency component of 100 KHz is mixed in the circuit current Is of 50 Hz generated from the AC power supply E.

Figure 2:
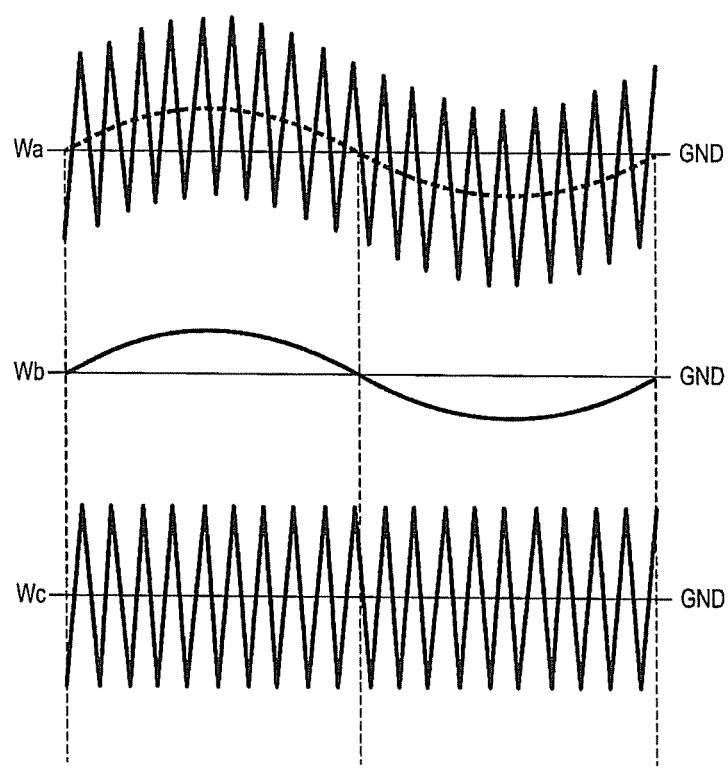
FIG. 2 is a diagram illustrating waveforms of a main current flowing through the power conversion circuit according to the first embodiment.

FIG. 2 is a diagram illustrating waveforms of a main current flowing through the power conversion circuit 11-1. In FIG. 2, a waveform Wa indicates the circuit current Is detected by the circuit current detection unit 13. A waveform Wb indicates a current passing through the low pass filter LPF. A waveform Wc indicates a current passing through the high pass filter HPF. As illustrated in FIG. 2, a current of a low frequency component (50 Hz) passing through the low pass filter LPF and a current of the high frequency component (100 KHz) passing through the high pass filter HPF are mixed in the circuit current Is. Also, only the current of the low frequency component (50 Hz) passes through the AC power supply E of the parallel circuit by an operation of the low pass filter LPF. Meanwhile, only the current of the high frequency component (100 Hz) passes through the high pass filter HPF by an operation of the high pass filter HPF. Therefore, two kinds of alternating currents having different frequencies are mixed and operate in the entire power conversion circuit 11.

The current of the high frequency component (100 KHz) is obtained by alternately opening and closing the first switch S1 and the second switch S2 at a high speed. For this, the first switch S1 and the second switch S2 may be alternately switched so that a pair of positive and negative sinusoidal envelopes that define peaks of the circuit current Is are generated, and directions of the current are switched between the envelopes. The process is described with reference to FIG. 3.

Figure 3:
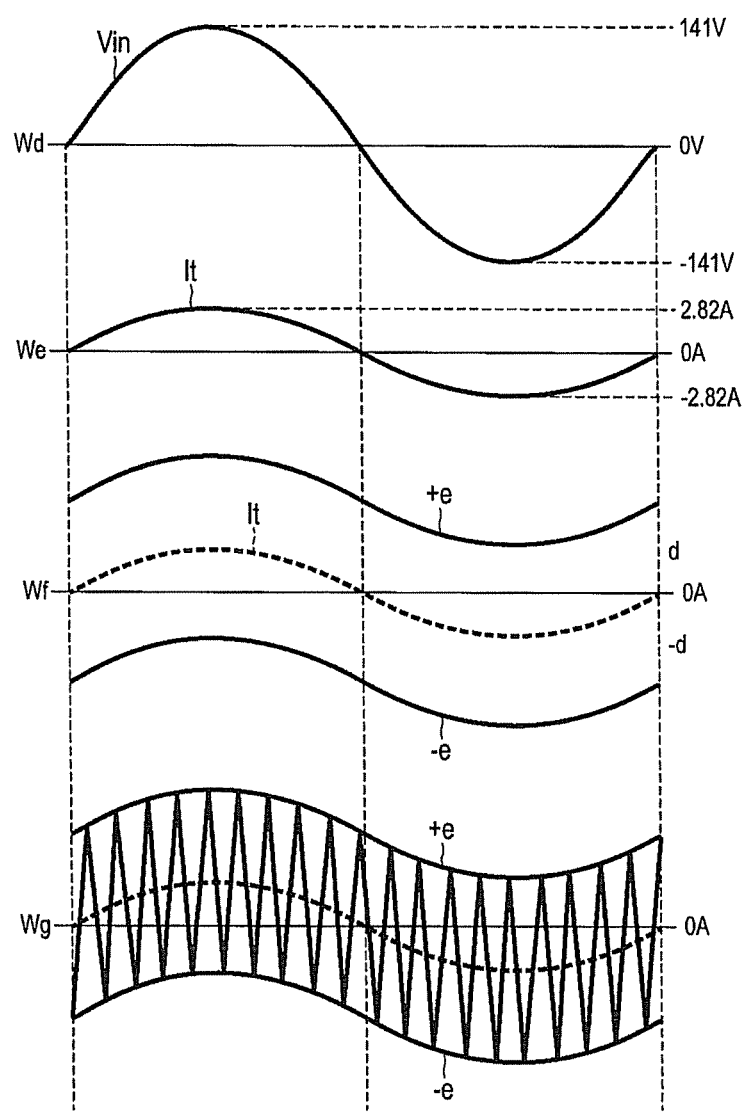
FIG. 3 is a diagram illustrating waveforms for describing an envelope generation process according to the first embodiment.

A waveform Wd of FIG. 3 indicates the supply voltage Vin. In the case of the AC power supply E, the supply voltage Vin changes in a sinusoidal manner. If the AC power supply E is a commercial power supply of 100 V, the waveform of the supply voltage Vin detected by the supply voltage detection unit 14 becomes a sine wave in which the positive peak value is 141 V and the negative peak value is −141 V as indicated in the waveform Wa. Here, according to the embodiment, sinusoidal envelopes are created based on the waveform of the supply voltage Vin.

Here, it is assumed that in the power conversion apparatus 1-1, electric power of 200 W [Watt] is supplied from the AC power supply E of 100 V to the load M. In this case, the supply voltage is 100 V. Accordingly, if an input current of 2 A [Ampere] in the same cycle with the supply voltage is obtained, the electric power of 200 W [Watt] is supplied from the AC power supply E of 100 V to the load M.

A waveform We of FIG. 3 indicates a sinusoidal current waveform of 2 A in the same cycle with the supply voltage. As illustrated in the figure, the positive peak value of the waveform is 2.82 A, and the negative peak value is −2.82 A. That is, a value obtained by multiplying the supply voltage Vin by the coefficient k=0.02 becomes a target current value It.

A waveform Wf of FIG. 3 indicates sinusoidal envelopes (current peak target value) required as a standard for switching the directions of the circuit current Is. The envelopes include a positive envelope +e for deciding a standard for switching the positive direction of the circuit current Is, and a negative envelope −e for deciding a standard for switching the negative direction of the circuit current Is. The positive envelope +e is generated by adding the width d to the target current value It. The negative envelope −e is generated by subtracting the width d from the target current value It. The width d is a value obtained by adding some margins to the negative (positive) peak value of the positive (negative) envelope +e (−e). This is because when the current value is negative (positive), the current value leaves envelop on the positive (negative) side.

The waveform We has the positive peak value of 2.82 A and the negative peak value of −2.82 A. If the waveform We is the target current value It, the width d is, for example, "3". Accordingly, when the current is on the negative peak, the positive envelope +e is 0.18 (=−2.82+3), and the envelope +e can be maintained on the positive region. In the same manner, when the current is on the positive peak, the negative envelope −e is −0.18 (=2.82−3), and the envelope −e can be maintained on the negative region.

When the circuit current Is reaches the positive envelope +e and reaches the negative envelope −e, the controller 12-1 generates the first pulse signal P1 and the second pulse signal P2 so that the opening and the closing of the first switch S1 and the second switch S2 are in reverse. Then, as illustrated in a waveform Wg, in the circuit current Is, the high frequency component (100 KHz) generated by the opening and the closing of the first switch S1 and the second switch S2 is mixed to the low frequency component (50 Hz) in the same cycle with the supply voltage. In addition, the frequency of the high frequency component is not fixed, and determined by the positive and negative envelopes +e and −e.

Figure 4:
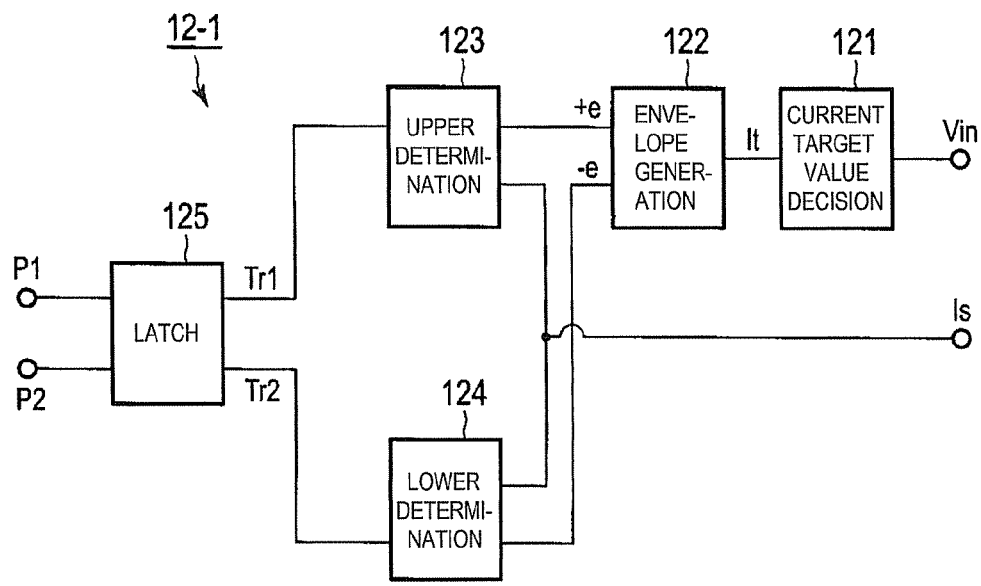
FIG. 4 is a block diagram illustrating a specific configuration of a controller according to the first embodiment.

FIG. 4 is a block diagram illustrating a specific configuration of the controller 12-1. The controller 12-1 includes a current target value decision unit 121, an envelope generation unit 122, an upper determination unit 123, a lower determination unit 124, and a latch circuit 125.

The current target value decision unit 121 receives a signal of the supply voltage Vin detected by the supply voltage detection unit 14 as an input, and multiplies a predetermined coefficient k by the signal, and decides the target current value It. Then, the current target value decision unit 121 supplies a signal corresponding to the current value It to the envelope generation unit 122 (decision portion).

The envelope generation unit 122 generates the positive envelope +e by adding the width d to the signal corresponding to the current value It. Additionally, the envelope generation unit 122 generates the negative envelope −e by subtracting the width d from the signal corresponding to the current value It. Then, the envelope generation unit 122 supplies a signal corresponding to the positive envelope +e to a first input terminal of the upper determination unit 123, and a signal corresponding to the negative envelope −e to a first input terminal of the lower determination unit 124 (envelope generation portion).

The signals of the circuit current Is detected by the circuit current detection unit 13 is supplied to the respective second input terminals of the upper determination unit 123 and the lower determination unit 124. Since the upper determination unit 123 determines whether the circuit current Is between the envelopes, that is, between the positive envelope +e and the negative envelope −e comes into contact with the positive envelope +e when the circuit current Is rises, a trigger signal Tr1 is supplied to the first input terminal of the latch circuit 125 whenever the contact is detected. Since the lower determination unit 124 determines whether the circuit current Is between the envelopes comes into contact with the negative envelope −e when the circuit current Is falls, a trigger signal Tr2 is supplied to the second input terminal of the latch circuit 125 whenever the contact is detected (determination portion).

When the trigger signal Tr1 is input to the first input terminal, the latch circuit 125 maintains a state in which the first pulse signal P1 is "0", and the second pulse signal P2 is "1". Additionally, when the trigger signal Tr2 is input to the second input terminal, the latch circuit 125 maintains a state in which the first pulse signal P1 is "1", and the second pulse signal P2 is "0" (pulse generation portion).

Figure 5:
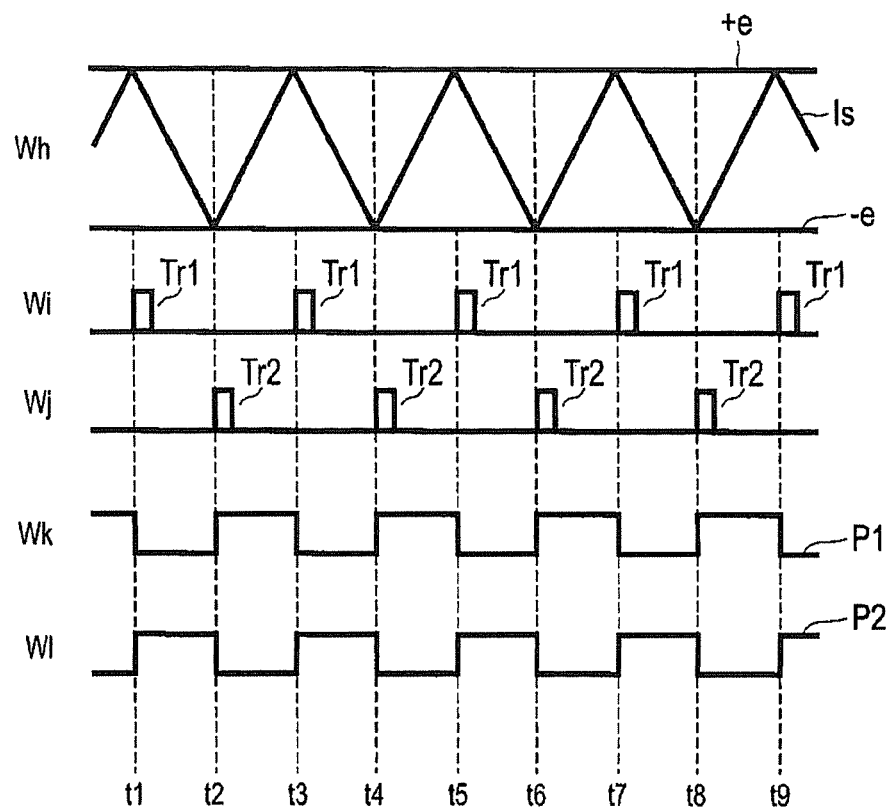
FIG. 5 is a diagram illustrating waveforms for describing the operation of the controller according to the first embodiment.

FIG. 5 is a diagram illustrating signal waveforms for describing the operation of the controller 12-1. A waveform Wh enlarges and illustrates a relationship between the circuit current Is and the positive envelope +e and the negative envelope −e generated in the envelope generation unit 122. A waveform Wi indicates the trigger signal Tr1 output from the upper determination unit 123. A waveform Wj indicates the trigger signal Tr2 output from the lower determination unit 124. A waveform Wk indicates the first pulse signal P1 output from the latch circuit 125. A waveform Wl indicates the second pulse signal P2 output from the latch circuit 125.

As illustrated in FIG. 5, if the circuit current Is that fluctuates between the envelopes comes in contact with the positive envelope +e (time points t1, t3, t5, t7, and t9), the first trigger signal Tr1 is output. Then, the first pulse signal P1 becomes "0", and the second pulse signal P2 becomes "1", so that the state is maintained. As a result, the second switch S2 is blocked, and the first switch S1 is open, so the circuit current Is switched to decrease.

Thereafter, if the circuit current Is comes into contact with the negative envelope −e (time points t2, t4, t6, and t8), the second trigger signal Tr2 is output. Then, the first pulse signal P1 becomes "1", and the second pulse signal P2 becomes "0", so that the state is maintained. As a result, the first switch S1 is blocked, and the second switch S2 is open, so the circuit current Is is switched to rise.

Therefore, the circuit current Is reciprocates between the envelopes, so that rise and fall are repeated. Then, if the circuit current Is reciprocates, the first switch S1 and the second switch S2 are alternately switched. As a result, the circuit current Is in which the high frequency component (100 KHz) is mixed with the low frequency component (50 Hz) of the AC power supply E flows through the power conversion circuit 11-1, and supplied to the load M. At this point, since only the low frequency component passing through the low pass filter LPF flows through the AC power supply E, the high frequency component does not leak to the outside.

According to the first embodiment as described above, it is possible to generate the sinusoidal current waveform identical to the supply voltage waveform by the power conversion circuit 11-1 having a simple circuit configuration and the controller 12-1 having a simple functional configuration. The possibility of generating the sinusoidal current waveform identical to the supply voltage waveform means to have a function of suppressing current harmonic. That is, it is very advantageous in the industry since it is possible to provide the power conversion apparatus 1-1 including the function of suppressing current harmonics at a low cost.

Additionally, if the load M is driven as an inverter, it is possible to convert the AC power supply E into a high frequency alternating current only by 1 step, and also it is possible to cause the width to the high frequency alternating current to be always constant regardless of the low frequency phase of the supply voltage. In this manner, the possibility of the conversion by 1 step means that extremely highly effective electric power conversion is possible, and the industrial effect is significant. Further, since constant electric power can be supplied to the load M, even if a circuit is simple, a constant operation can be realized.

Second Embodiment

In the first embodiment, since the first pulse signal P1 and the second pulse signal P2 are simultaneously switched, there is a danger of switching on the first switch S1 and the second switch S2 at the same time at the moment of switching. In order to avoid the danger, a delay time (dead time) Δt is provided when the first pulse signal P1 and the second pulse signal P2 are switched so that the first switch S1 and the second switch S2 are not turned on at the same time according to a second embodiment.

Figure 6:
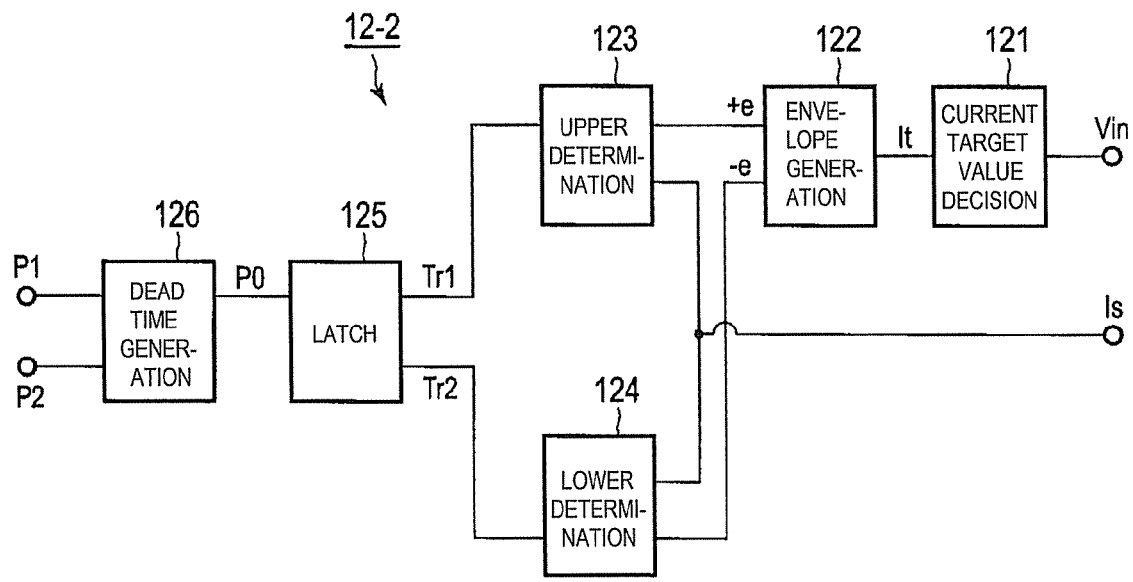
FIG. 6 is a block diagram illustrating a specific configuration of a controller according to a second embodiment.

FIG. 6 is a block diagram illustrating a specific configuration of a controller 12-2 of a power conversion apparatus 1-2 according to the second embodiment. Portions common to the controller 12-1 according to the first embodiment are denoted by the same reference numerals, and the detailed descriptions thereof are omitted. Additionally, since a power conversion circuit 11-2 is the same with that in the first embodiment, the description thereof is omitted here.

The controller 12-2 includes a dead time generation unit 126 in addition to the current target value decision unit 121, the envelope generation unit 122, the upper determination unit 123, the lower determination unit 124, and the latch circuit 125. The dead time generation unit 126 inputs a pulse signal P0 output from the latch circuit 125. Then, the dead time generation unit 126 generates the first pulse signal P1 and the second pulse signal P2 according to the pulse signal P0, and supplies the first pulse signal P1 and the second pulse signal P2 respectively to the first and second switches S1 and S2.

Figure 7:
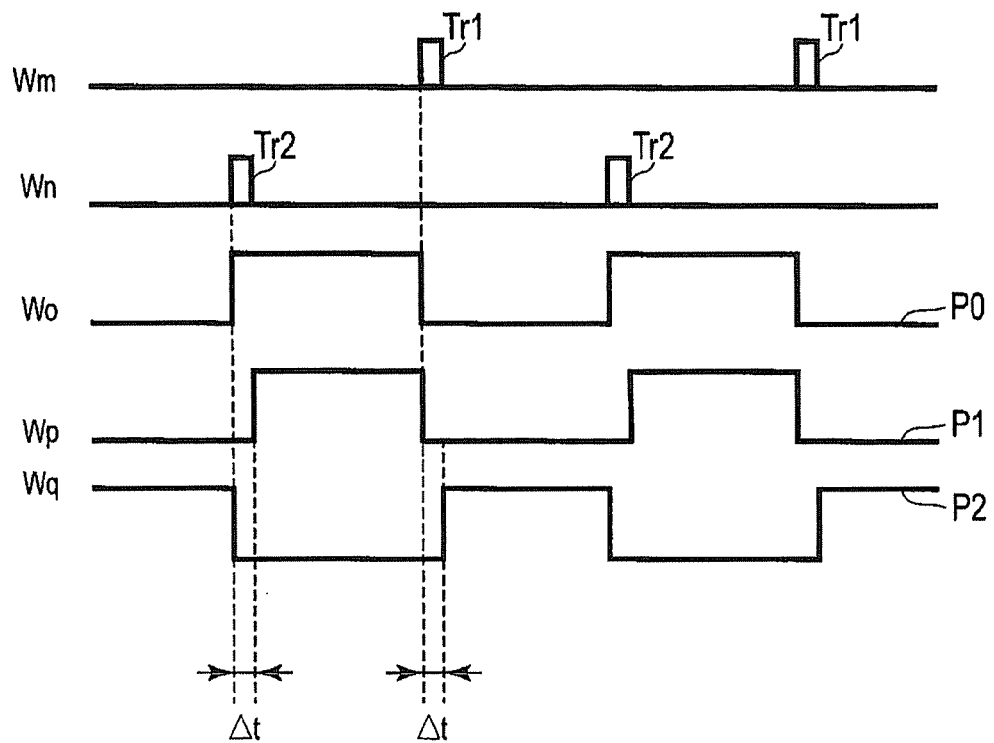
FIG. 7 is a diagram illustrating waveforms for describing the operation of the controller according to the second embodiment.

FIG. 7 is a diagram illustrating a signal waveform for describing the operation of the dead time generation unit 126. A waveform Wm indicates the trigger signal Tr1 output from the upper determination unit 123. A waveform Wn indicates the trigger signal Tr2 output from the lower determination unit 124. A waveform Wo indicates the pulse signal P0 output from the latch circuit 125. A waveform Wp indicates the first pulse signal P1 output from the dead time generation unit 126. A waveform Wq indicates the second pulse signal P2 output from the dead time generation unit 126.

As illustrated in FIG. 7, when the trigger signal Tr2 is input, the latch circuit 125 maintains a state in which the pulse signal P0 is "1". Additionally, when the trigger signal Tr1 is input, the latch circuit 125 maintains a state in which the pulse signal P0 is "0".

When the pulse signal P0 is "1", the dead time generation unit 126 maintains a state in which the second pulse signal P2 is "0". Then, if the predetermined delay time Δt passes after the pulse signal P2 is "0", the dead time generation unit 126 maintains a state in which the first pulse signal P1 is "1". Additionally, if the pulse signal P0 becomes "0", the dead time generation unit 126 maintains a state in which the first pulse signal P1 is "0". Then, if the predetermined delay time Δt passes after the pulse signal P0 is "0", the dead time generation unit 126 maintains a state in which the second pulse signal P2 is "1". Here, the pulse generation portion further includes a delay portion that deviates timing for outputting the pulse signal P1 to the first switch S1 and the pulse signal P2 to the second switch S2 so that the first switch S1 and the second switch S2 are not switched at the same time.

In this manner, according to the second embodiment, the first pulse signal P1 and the second pulse signal P2 are not switched at the same time by an operation of the dead time generation unit 126. Accordingly, it is possible to avoid a danger of switching on the first switch S1 and the second switch S2 at the same time. In addition, it is obvious that the same effect according to the first embodiment described above can be obtained.

Third Embodiment

Next, a third embodiment is described. In addition, according to the third embodiment, portions common to the second embodiment are denoted by the same reference numerals, and the detailed descriptions thereof are omitted.

Figure 8:
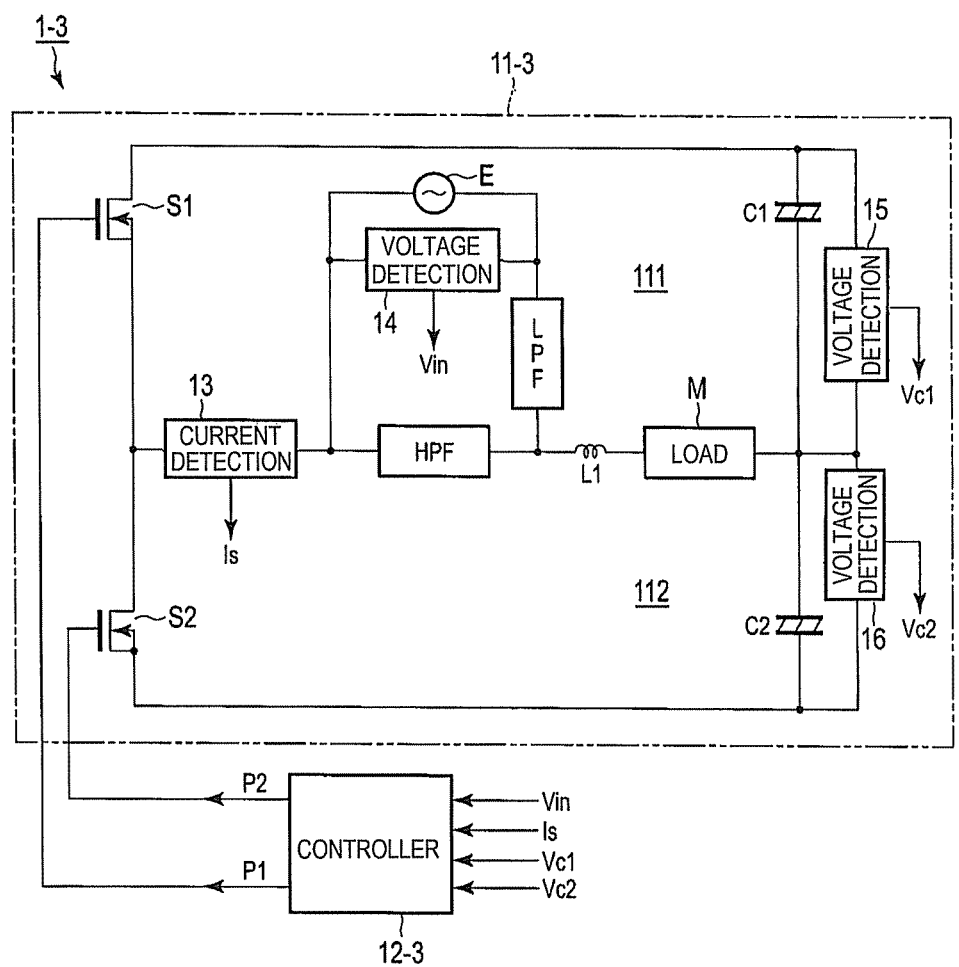
FIG. 8 is a diagram illustrating a circuit configuration of a power conversion apparatus according to a third embodiment.

FIG. 8 is a diagram illustrating a circuit configuration of a power conversion apparatus 1-3 according to the third embodiment. The power conversion apparatus 1-3 includes a power conversion circuit 11-3 and a controller 12-3 thereof. The power conversion circuit 11-3 further includes a first capacitance voltage detection unit 15 and a second capacitance voltage detection unit 16 in addition to the power conversion circuit 11-2 according to the second embodiment.

The first capacitance voltage detection unit 15 detects a potential difference generated between both ends of the first capacitor C1 as a capacitance voltage Vc1 (first capacitance voltage detection portion). The second capacitance voltage detection unit 16 detects potential difference generated between both ends of the second capacitor C2 as a capacitance voltage Vc2 (second capacitance voltage detection portion). The first and second capacitance voltage detection units 15 and 16 respectively provide the detected capacitance voltages Vc1 and Vc2 to the controller 12-1.

The controller 12-3 generates the first and second the pulse signals P1 and P2 based on the circuit current Is, the supply voltage Vin, and the capacitance voltages Vc1 and Vc2. Then, the controller 12-3 supplies the first pulse signal P1 to the first switch S1, and the second pulse signal P2 to the second switch S2.

Figure 9:
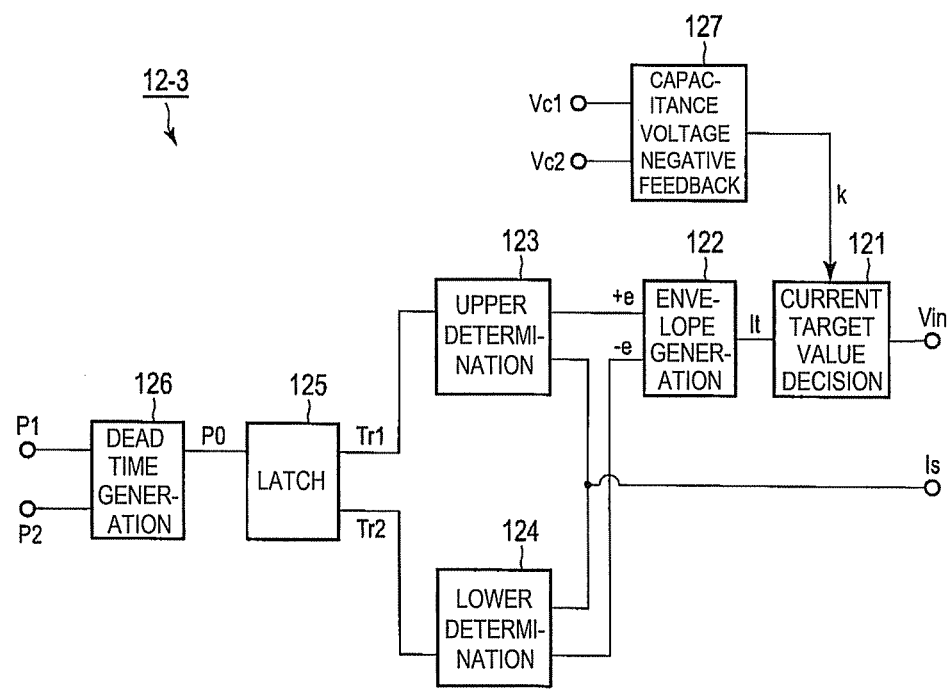
FIG. 9 is a block diagram illustrating a specific configuration of a controller according to the third embodiment.

FIG. 9 is a block diagram illustrating a specific configuration of the controller 12-3. The controller 12-3 includes a capacitance voltage negative feedback unit 127 in addition to the current target value decision unit 121, the envelope generation unit 122, the upper determination unit 123, the lower determination unit 124, the latch circuit 125 and the dead time generation unit 126.

The capacitance voltage negative feedback unit 127 sets a coefficient k to be used in the current target value decision unit 121. That is, the capacitance voltage negative feedback unit 127 inputs the capacitance voltage Vc1 of the first capacitor C1 detected by the first capacitance voltage detection unit 15 and the capacitance voltage Vc2 of the second capacitor C2 detected by the second capacitance voltage detection unit 16. Then, the capacitance voltage negative feedback unit 127 determines whether a total capacitance voltage Vc1+Vc2 obtained by adding the capacitance voltage Vc1 and the capacitance voltage Vc2 is higher or lower than a first threshold value SH1, sets the coefficient k to be a first value k1 when the total capacitance voltage Vc1+Vc2 is higher than the first threshold value SH1. In contrast, if the capacitance voltage is lower than a second threshold value SH2 which is lower than the first threshold value SH1, the capacitance voltage negative feedback unit 127 sets the coefficient k to be a second value k2 which is smaller than the first value k1 (capacitance voltage negative feedback portion).

The current target value decision unit 121 receives a signal of the supply voltage Vin detected by the supply voltage detection unit 14 as an input, multiplies the signal by the coefficient k (k1 or k2), and decides the target current value It.

Figure 10:
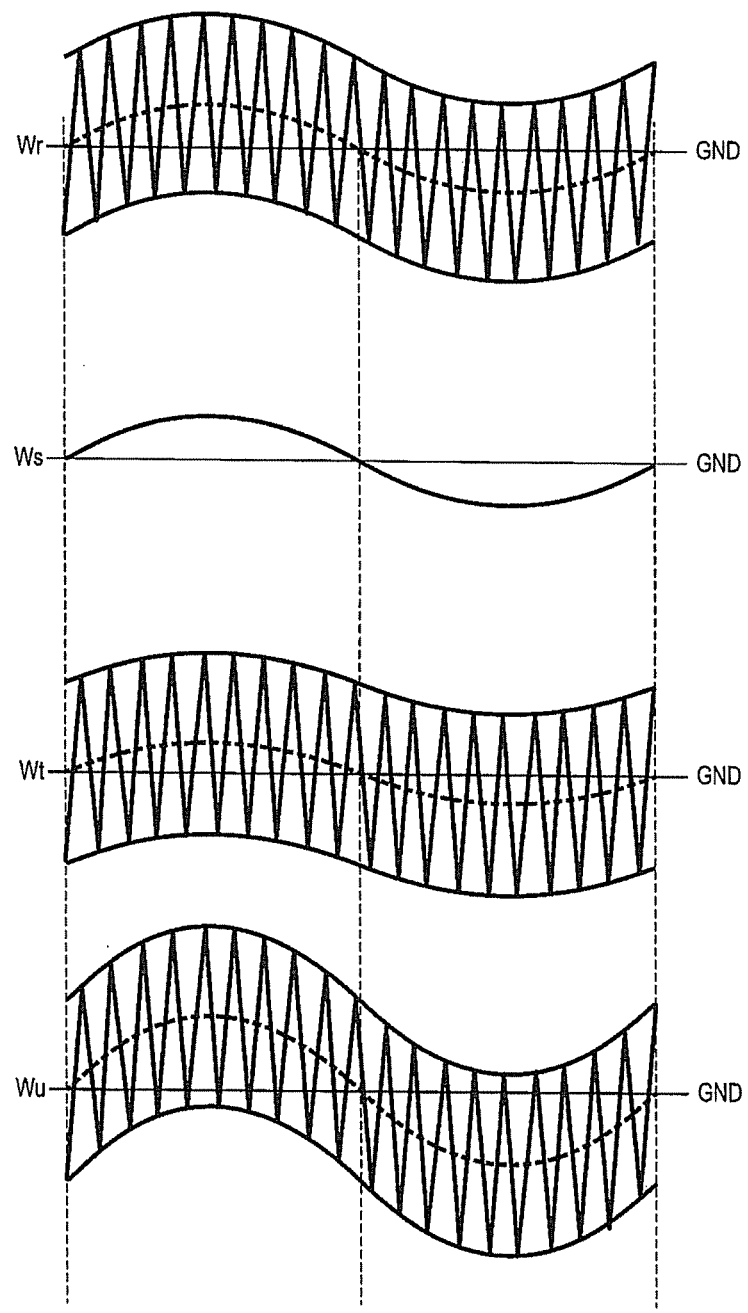
FIG. 10 is a diagram illustrating waveforms for describing an operation of the power conversion apparatus according to the third embodiment.

FIG. 10 is a diagram illustrating waveforms for describing an operation of the power conversion apparatus 1-3. In FIG. 10, a waveform Wr indicates the circuit current Is detected by the circuit current detection unit 13. In the circuit current Is, the high frequency component (100 Hz) generated by the opening and the closing of the first switch S1 and the second switch S2 is mixed with the low frequency component (50 Hz) in the same cycle with the supply voltage.

A waveform Ws indicates a current flowing to the AC power supply E after the circuit current Is passes through the low pass filter LPF. In order to remove the high frequency component from the low pass filter LPF, a current only with the low frequency component of 50 Hz flows to the AC power supply E.

In the operation circumstance as described above, when the input electric power is either increased or decreased, since the supply voltage Vin is common, an input current Iin may be increased or decreased. In order to increase or decrease the input current Iin, the coefficient k may be changed in a step of deciding the target current value It by multiplying the waveform of the supply voltage Vin by the coefficient k according to the first embodiment. For example, if the waveform Ws is the target current value It and the peak of the current value It is 2.82 A, the coefficient k is set to be great in order to increase the input current Iin so that the peak becomes, for example, 2.9 A. In contrary, in order to decrease the input current Iin, the coefficient k is set to be small so that the peak becomes, for example, 2.7 A.

A waveform Wt indicates a case in which the coefficient k is small, and wave motions of the low frequency component of 50 Hz are small. However, since the interval between the envelopes determined by the width d is not changeable, the switching frequency of the high frequency component (100 KHz) reciprocating between the envelopes is hardly influenced. If the switching frequency is not changed, the electric power consumed in the load M driven as the inverter hardly changes. That is, only the input electric power decreases without changing the output electric power. Therefore, a relationship of "input electric power<output electric power" is eventually satisfied. Then, the electric charges of the first capacitor C1 and the second capacitor C2 are consumed. That is, the total capacitance voltage Vc1+Vc2 decreases.

Here, in the capacitance voltage negative feedback unit 127, if the total capacitance voltage Vc1+Vc2 decreases to be lower than the second threshold value SH2, the coefficient k is set to be the first value k1. As a result, since the wave motion of the target current value It is great, the input current Iin increases.

In a waveform Wu, the coefficient k is great, and the wave motion of the low frequency component of 50 Hz is great. However, since the interval between the envelopes defined by the width d is not changed, the switching frequency of the high frequency component (100 KHz) reciprocating between the envelopes is hardly influenced. If the switching frequency is not changed, the electric power consumed in the load M driven as the inverter hardly changes. That is, only the input electric power increases without changing the output electric power. Therefore, a relationship of "input electric power>output electric power" is eventually satisfied. Then, the electric charges of the first capacitor C1 and the second capacitor C2 are accumulated. That is, the total capacitance voltage Vc1+Vc2 increases.

Here, if the total capacitance voltage Vc1+Vc2 becomes higher than the first threshold value SH1 (SH1>SH2), the capacitance voltage negative feedback unit 127 sets the coefficient k to be the second value k2 (k2<k1). As a result, since the wave motion of the target current value It becomes small, the input current Iin decreases.

In this manner, the total capacitance voltage Vc1+Vc2 obtained by adding the capacitance voltage Vc1 of the first capacitor C1 and the capacitance voltage Vc2 of the second capacitor C2 fluctuates according to the relationship in balance with the input electric power and the output electric power, that is, the electric power consumed in the load M. Generally, since the impedance of the load M fluctuates, the consumed electric power frequently fluctuates, and the total capacitance voltage Vc1+Vc2 also fluctuates according to the change.

According to the third embodiment, the total capacitance voltage Vc1+Vc2 is negatively fed back to the coefficient k when the target value of the circuit current Is is decided. Specifically, if the total capacitance voltage Vc1+Vc2 is high, the target value of the circuit current Is decreases by setting the coefficient k to be small. In contrast, if the total capacitance voltage Vc1+Vc2 is low, the target value of the circuit current Is is set to be high by setting the coefficient k to be great. Accordingly, even if the impedance of the load M changes, the total capacitance voltage Vc1+Vc2 can be stably maintained.

According to the third embodiment, it is possible to control only the input electric power by being separated from the output electric power (the consumed electric power of the load M). Accordingly, it is possible to provide the power conversion apparatus 1-3 having a simple configuration and good controllability. The simple configuration and easy controllability are greatly advantageous in the industry.

In addition, according to the third embodiment, the relationship between the first threshold value SH1 and the second threshold value SH2 is set to be [SH1>SH2], but the relationship may be [SH1=SH2].

Additionally, according to the third embodiment, through the capacitance voltage negative feedback unit 127 is provided to the controller 12-2 of the second embodiment, but the capacitance voltage negative feedback unit 127 may be provided to the controller 12-1 of the first embodiment. In this case, it is also possible to obtain the effect described in the third embodiment.

Fourth Embodiment

Next, a fourth embodiment is described. According to the third embodiment, a case in which the input electric power is controlled by being separated from the output electric power (the consumed electric power of the load M) is described. According to the fourth embodiment, a case in which an output current Tout (the electric current flowing through the load M) is controlled by being separated from the input current Iin (the electric current flowing through the AC power supply E) is further described. In addition, according to the fourth embodiment, the portions common to the third embodiment are denoted by the same reference numerals, and the detailed descriptions thereof are omitted.

A power conversion apparatus 1-4 according to the fourth embodiment includes a power conversion circuit 11-4 and a controller 12-4 thereof. The power conversion circuit 11-4 has the same configuration as the power conversion circuit 11-3 according to the third embodiment.

Figure 11:
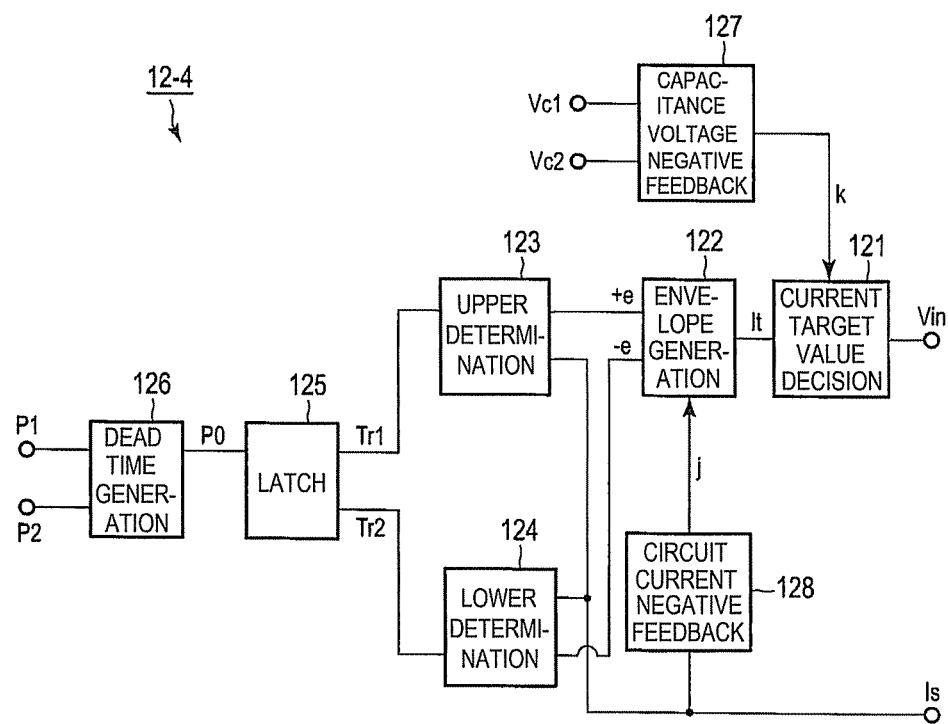
FIG. 11 is a block diagram illustrating a specific configuration of a controller according to a fourth embodiment.

FIG. 11 is a block diagram illustrating a specific configuration of the controller 12-4. The controller 12-4 includes a circuit current negative feedback unit 128 in addition to the current target value decision unit 121, the envelope generation unit 122, the upper determination unit 123, the lower determination unit 124, the latch circuit 125, the dead time generation unit 126, and the capacitance voltage negative feedback unit 127.

The circuit current negative feedback unit 128 receives the circuit current Is as an input. Then, when the circuit current Is is greater than a third threshold value SH3, the circuit current negative feedback unit 128 sets a coefficient j to be a value j1 smaller than "1". In contrary, if the circuit current Is is lower than a fourth threshold value SH4 which is smaller than the third threshold value SH3, the circuit current negative feedback unit 128 sets the coefficient j to be a value j2 greater than "1". The circuit current negative feedback unit 128 provides the coefficient j to the envelope generation unit 122. Here, the control portion configured with the controller 12-4 further includes a circuit current negative feedback portion that adjusts the interval between the envelope on the positive side and the envelope on the negative side based on the value of the circuit current.

The envelope generation unit 122 obtains the product jd by multiplying the predetermined width d by the coefficient j. Then, the envelope generation unit 122 generates the positive envelope +e by adding the product jd to a signal corresponding to the target current value It. Additionally, the envelope generation unit 122 generates the negative envelope −e by subtracting the product jd from the signal corresponding to the current value It. Then, the envelope generation unit 122 supplies the signal corresponding to the positive envelope +e to the first input terminal of the upper determination unit 123, and supplies the signal corresponding to the negative envelope −e to the first input terminal of the lower determination unit 124.

The operations of the upper determination unit 123, the lower determination unit 124, the latch circuit 125, and the dead time generation unit 126 are the same as those in the third embodiment.

Figure 12:
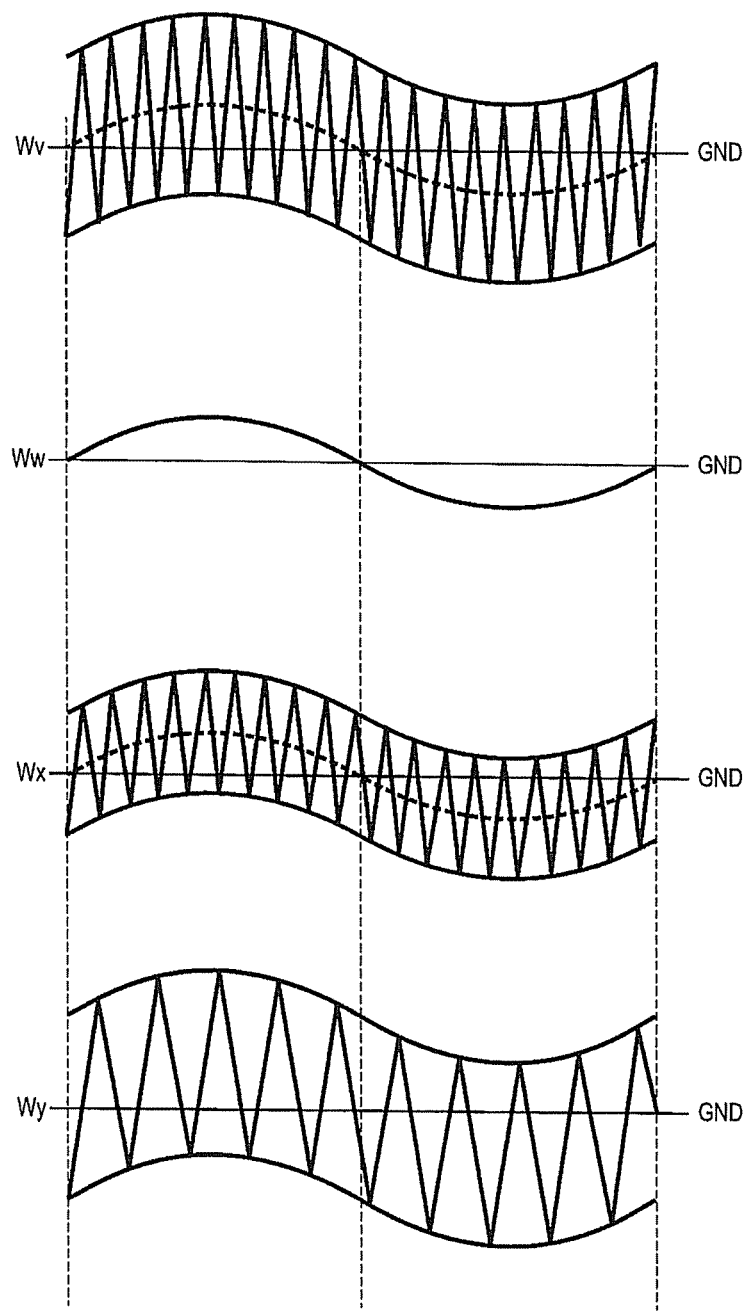
FIG. 12 is a diagram illustrating waveforms for describing an operation of a power conversion apparatus according to the fourth embodiment.

FIG. 12 is a diagram illustrating waveforms for describing the operation of the power conversion apparatus 1-4. In FIG. 12, a waveform Wv indicates the circuit current Is that is detected by the circuit current detection unit 13. In the circuit current Is, the high frequency component (100 Hz) generated by the opening and the closing of the first switch S1 and the second switch S2 is mixed with the low frequency component (50 Hz) in the same cycle as the supply voltage.

A waveform Ww indicates a current flowing to the AC power supply E after the circuit current Is passes through the low pass filter LPF. Since the high frequency component is removed from the low pass filter LPF, a current only with the low frequency component of 50 Hz flows to the AC power supply E.

In the operation circumstance as described above, if it is desired to decrease the current supplied to the load M, that is, a so-called output current Iout, that is, if the circuit current Is is increased, the circuit current negative feedback unit 128 sets the coefficient j to be the value j1 smaller than "1". Then, as indicated by a waveform Wx, the interval between the positive envelope +e and the negative envelope −e becomes narrow. If the interval between the envelopes becomes narrow, a control is performed so that the circuit current Is reciprocates between the envelopes, and the circuit current Is decreases. At the same time, the frequency of the high frequency component mixed with the circuit current Is becomes high. Therefore, the output current Iout decreases.

In contrary, if it is desired to increase the output current Iout, that is, the circuit current Is is decreased, the circuit current negative feedback unit 128 sets the coefficient j to be the value j2 greater than "1". Then, as indicated by a waveform Wy, the interval between the positive envelope +e and the negative envelope −e becomes wide. If the interval between the envelopes becomes wide, the circuit current Is increases. At the same time, the frequency of the high frequency component to be mixed in the circuit current Is decreases. Therefore, the output current Iout increases.

Meanwhile, the input current Iin changes to correspond to the waveform of a central line between the positive envelope +e and the negative envelope −e. Therefore, even if the interval between the envelopes changes by multiplying the width d by the coefficient j, the wave motion of the input current Iin does not change. That is, the input current Iin does not change. If the input current Iin does not change, the input electric power also does not change.

According to the fourth embodiment described above, it is possible to control the output current Iout flowing to the load M by being separated from the input current Iin flowing to the AC power supply E. Accordingly, it is possible to provide the power conversion apparatus 1-4 having a simple configuration and good controllability to the load M. The simple configuration and easy controllability are greatly advantageous in the industry.

In addition, according to the fourth embodiment, the relationship between the third threshold value SH3 and the fourth threshold value SH4 is set to be [SH3>SH4], but the relationship may be [SH3=SH4].

Additionally, according to the fourth embodiment, the circuit current negative feedback unit 128 is provided to the controller 12-3 of the third embodiment, but the circuit current negative feedback unit 128 may be provided to the controller 12-1 of the first embodiment or the controller 12-2 of the second embodiment. In this case, it is also possible to obtain the effect described in the fourth embodiment.

Fifth Embodiment

Next, a fifth embodiment is described. In the fourth embodiment, a case in which the output current Iout which is separated from the input current Iin is controlled is described. According to the fifth embodiment, a case in which a control is performed so that the voltage applied to the load M is stably maintained. The control described above generally is referred to as a voltage supply-type inverter control. In addition, according to the fifth embodiment, the portions common to the third embodiment are denoted by the same reference numerals, and the detailed descriptions thereof are omitted.

Figure 13:
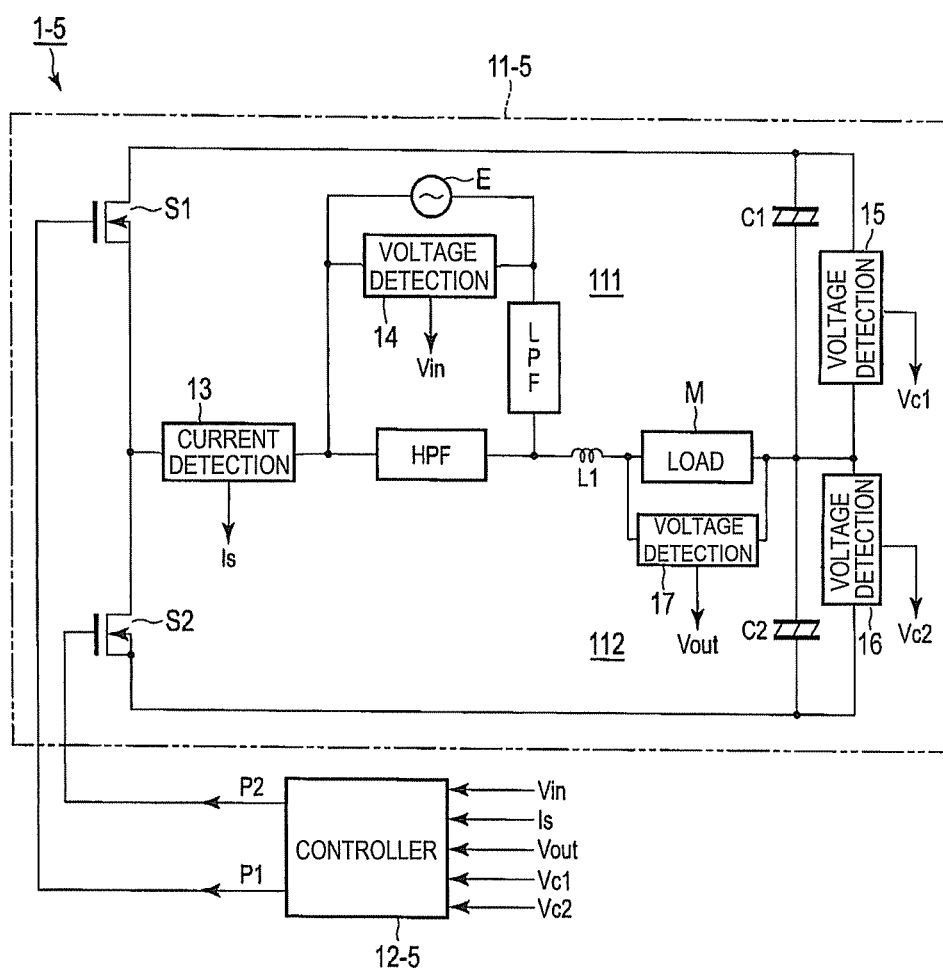
FIG. 13 is a diagram illustrating a circuit configuration of a power conversion apparatus according to a fifth embodiment.

FIG. 13 is a diagram illustrating a circuit configuration of a power conversion apparatus 1-5 according to the fifth embodiment. The power conversion apparatus 1-5 includes a power conversion circuit 11-5 and a controller 12-5 thereof. The power conversion circuit 11-5 includes a load voltage detection unit 17 in addition to the power conversion circuit 11-3 of the third embodiment. The load voltage detection unit 17 detects a potential difference generated between both ends of the load M as a load voltage Vout. The load voltage detection unit 17 provides the detected load voltage Vout to the controller 12-5. Here, the load voltage detection unit 17 configures a load voltage detection portion that detects the potential difference generated between both ends of the load as a load voltage.

The controller 12-5 generates the first and second pulse signals P1 and P2 based on the circuit current Is, the supply voltage Vin, the capacitance voltages Vc1 and Vc2, and the load voltage Vout. Then, the controller 12-5 supplies the first pulse signal P1 to the first switch S1, and the second pulse signal P2 to the second switch S2.

Figure 14:
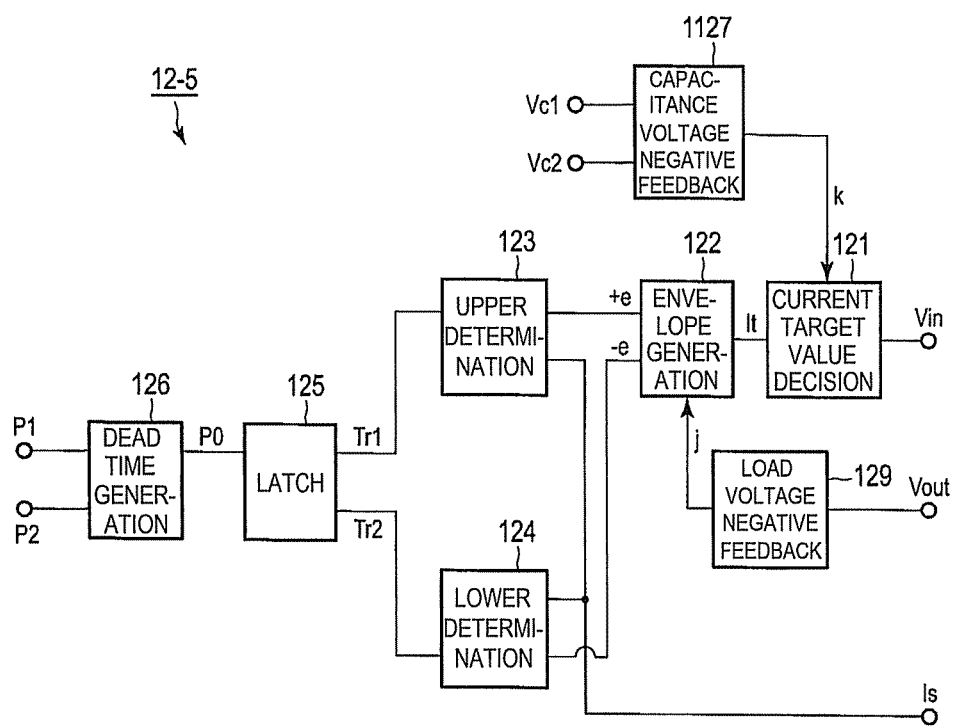
FIG. 14 is a block diagram illustrating a specific configuration of a controller according to the fifth embodiment.

FIG. 14 is a block diagram illustrating a specific configuration of the controller 12-5. The controller 12-5 includes a load voltage negative feedback unit 129 in addition to the current target value decision unit 121, the envelope generation unit 122, the upper determination unit 123, the lower determination unit 124, the latch circuit 125, the dead time generation unit 126, and the capacitance voltage negative feedback unit 127.

The load voltage negative feedback unit 129 receives the load voltage Vout as an input. Even if the circuit current Is is constant, if the impedance of the load M changes, the load voltage Vout fluctuates. When the load voltage Vout is higher than a fifth threshold value SH5, the load voltage negative feedback unit 129 sets the coefficient j to be a value j1 smaller than "1". In contrary, if the load voltage Vout is lower than a sixth threshold value SH6 which is smaller than the fifth threshold value SH5, the load voltage negative feedback unit 129 sets the coefficient j to be a value j2 greater than "1". The load voltage negative feedback unit 129 provides the coefficient j to the envelope generation unit 122 (load voltage negative feedback portion). Here, the control portion configured with the controller 12-5 further includes a load voltage negative feedback portion that adjusts an interval between the envelope on the positive side and the envelope on the negative side based on the load voltage.

The envelope generation unit 122 obtains the product jd by multiplying the predetermined width d by the coefficient j. Then, the envelope generation unit 122 generates the positive envelope +e by adding the product jd to the signal corresponding to the target current value It. Additionally, the envelope generation unit 122 generates the negative envelope −e by subtracting the product jd from the signal corresponding to the current value It. Then, the envelope generation unit 122 supplies the signal corresponding to the positive envelope +e to the first input terminal of the upper determination unit 123 and supplies the signal corresponding to the negative envelope −e to the first input terminal of the lower determination unit 124.

The operations of the upper determination unit 123, the lower determination unit 124, the latch circuit 125, and the dead time generation unit 126 are the same as those in the third embodiment.

The description of the operation of the power conversion apparatus 1-5 can be provided with reference to the waveform diagram of FIG. 12 without change. That is, when it is desired to decrease the voltage applied to the load M, that is, when the load voltage Vout increases, the coefficient j is set to be the value j1 smaller than "1". Then, the interval between the positive envelope +e and the negative envelope −e becomes narrow. If the interval between the envelopes is narrow, the voltage applied to the load M decreases.

In contrary, when it is desired to increase the voltage applied to the load M, that is, when the load voltage Vout decreases, the coefficient j is set to be the value j2 greater than "1". Then, the interval between the positive envelope +e and the negative envelope −e becomes wide. If the interval between the envelopes is wide, the voltage applied to the load M increases.

Meanwhile, the input current Iin changes to be correspond to the waveform of the central line between the positive envelope +e and the negative envelope −e. Therefore, even if the interval between the envelopes changes by multiplying the width d by the coefficient j, the wave motion of the input current Iin does not change. That is, the input current Iin does not change. If the input current Iin does not change, the input electric power also does not change.

According to the fifth embodiment described above, a control may be performed so that the voltage applied to the load M without changing the input electric power is constant. This means that even if a high-speed response control is performed on the fast change of the load M, this does not influence on the input current waveform. That is, since both aspects of the high-speed responsiveness required to the fluctuation of the load and the constant control on the harmonics of the input current are satisfied at the same time, the industrial effect is great.

In addition, according to the fifth embodiment, the relationship between the fifth threshold value SH5 and the sixth threshold value SH6 is set to be [SH5>SH6], but the relationship may be [SH5=SH6].

Additionally, according to the fifth embodiment, the load voltage negative feedback unit 129 is provided to the controller 12-3 of the third embodiment, but the load voltage negative feedback unit 129 may be provided to the controller 12-1 of the first embodiment or the controller 12-2 of the second embodiment. In this case, it is also possible to obtain the effect described in the fifth embodiment.

Sixth Embodiment

According to the first to fifth embodiments, in the operations of the power conversion apparatuses 1-1 to 1-5, the total capacitance voltage Vc1+Vc2 obtained by adding the capacitance voltage Vc1 of the first capacitor C1 and the capacitance voltage Vc2 of the second capacitor C2 in the power conversion circuits 11-1 to 11-5 is constant. However, the capacitance voltage Vc1 and the capacitance voltage Vc2 are gradually separated due to the fluctuations in the driving of the first and second switches S1 and S2 or the like. When the separation is great, there is a concern that the voltage may exceed the withstand voltage in one capacitor, and there is a concern that the voltage is too low in the other capacitor so that a circuit operation is not achieved. However, even in such cases, the total capacitance voltage Vc1+Vc2 does not change. Therefore, the generation of the separation between the capacitance voltage Vc1 and the capacitance voltage Vc2 may not be detected by detecting the total capacitance voltage Vc1+Vc2. Then, according to the sixth embodiment, such a defect is resolved as described below.

A power conversion apparatus 1-6 according to a sixth embodiment includes a power conversion circuit 11-6 and a controller 12-6 thereof. The power conversion circuit 11-6 has the same configuration as the power conversion circuit 11-5 according to the fifth embodiment.

Figure 15:
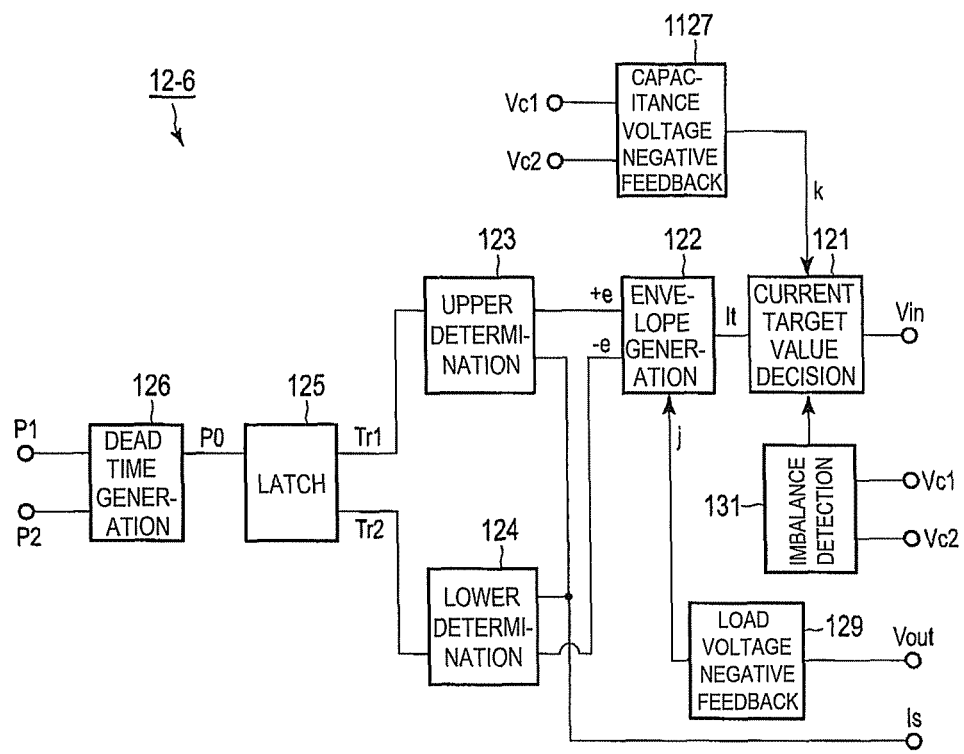
FIG. 15 is a block diagram illustrating a specific configuration of a controller according to a sixth embodiment.

FIG. 15 is a block diagram illustrating a specific configuration of the controller 12-6. The controller 12-6 includes an imbalance detection unit 131 in addition to the current target value decision unit 121, the envelope generation unit 122, the upper determination unit 123, the lower determination unit 124, the latch circuit 125, the dead time generation unit 126, the capacitance voltage negative feedback unit 127, and the load voltage negative feedback unit 129.

The imbalance detection unit 131 inputs the capacitance voltage Vc1 detected by the first capacitance voltage detection unit 15 and the capacitance voltage Vc2 detected by the second capacitance voltage detection unit 16. Then, the imbalance detection unit 131 determines whether a value Vc1−Vc2 obtained by subtracting the capacitance voltage Vc2 from the capacitance voltage Vc1 is positive or negative. If the value Vc1−Vc2 is positive, the imbalance detection unit 131 provides a positive imbalance signal (+) to the current target value decision unit 121. In contrary, if the value Vc1−Vc2 is negative, the imbalance detection unit 131 provides a negative imbalance signal (−) to the current target value decision unit 121. If the value Vc1−Vc2 is "0", the imbalance signal is not provided to the current target value decision unit 121 (imbalance detection portion).

When the positive imbalance signal (+) is received from the imbalance detection unit 131, the current target value decision unit 121 multiplies the coefficient k set by the capacitance voltage negative feedback unit 127 by a predetermined coefficient h1. The coefficient h1 is a value smaller than "1" when the supply voltage Vin is positive, and greater than "1" when the supply voltage Vin is negative. The current target value decision unit 121 decides the target current value It by multiplying the signal of the supply voltage Vin by the coefficient k×h1. Then, the current target value decision unit 121 supplies the signal corresponding to the current value It to the envelope generation unit 122.

In the same manner, when the negative imbalance signal (−) is received from the imbalance detection unit 131, the current target value decision unit 121 multiplies the coefficient k set by the capacitance voltage negative feedback unit 127 by a predetermined coefficient h2. The coefficient h2 is a value greater than "1" when the supply voltage Vin is positive, and smaller than "1" when the supply voltage Vin is negative. The current target value decision unit 121 decides the target current value It by multiplying the signal of the supply voltage Vin by the coefficient k×h2. Then, the current target value decision unit 121 supplies the signal corresponding to the current value It to the envelope generation unit 122.

In addition, if the positive or negative imbalance signal is not received, the current target value decision unit 121 uses the coefficient k without change. That is, the current target value decision unit 121 decides the target current value It by multiplying the signal of the supply voltage Vin by the coefficient k. Then, the current target value decision unit 121 supplies the signal corresponding to the current value It to the envelope generation unit 122.

The operations of the envelope generation unit 122, the upper determination unit 123, the lower determination unit 124, and the latch circuit 125 are the same as the fifth embodiment.

Figure 16:
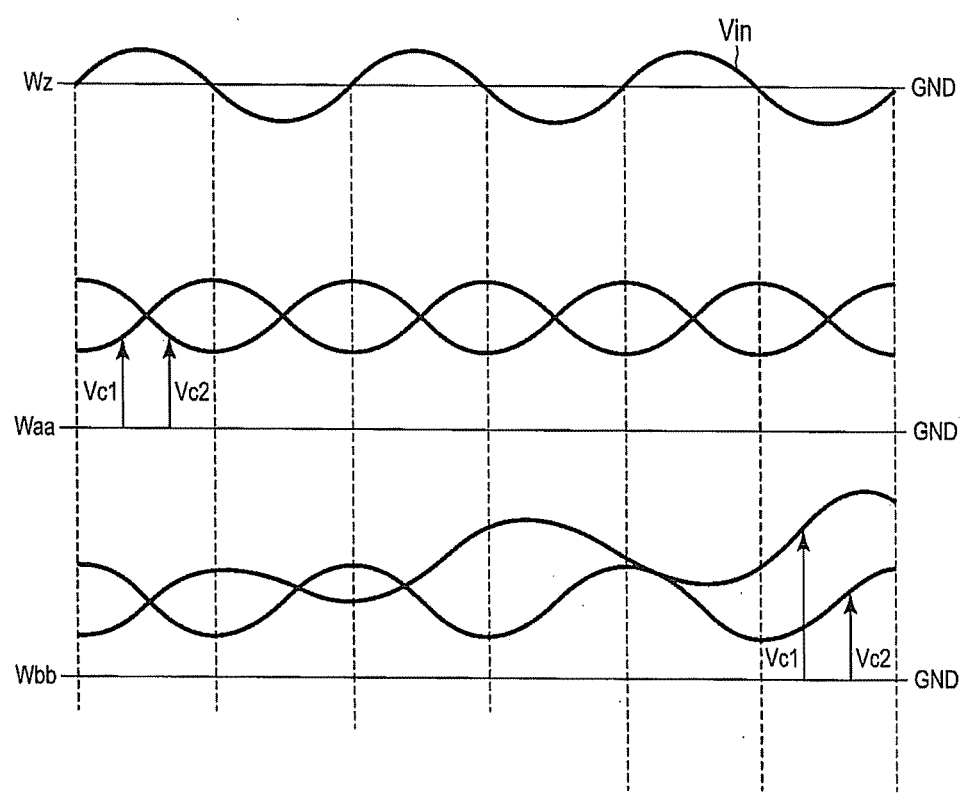
FIG. 16 is a diagram illustrating waveforms in an example in which imbalance between capacitance voltages of a first capacitor and a second capacitor is generated according to the sixth embodiment.

FIG. 16 is a diagram illustrating waveforms in an example in which a balance between the capacitance voltage Vc1 of the first capacitor C1 and the capacitance voltage Vc2 of the second capacitor C2 is disrupted. In FIG. 16, a waveform Wz is a waveform of the supply voltage Vin. When there is no fluctuation in the driving of the first and second switches S1 and S2, the capacitance voltage Vc1 of the first capacitor C1 and the capacitance voltage Vc2 of the second capacitor C2 fluctuate by deviating the phase by 180° as indicated in a waveform Waa. Therefore, in the operation of the power conversion apparatus 1-6, the total capacitance voltage Vc1+Vc2 is maintained to be constant.

However, if the fluctuation is generated in the driving of the first and second switches S1 and S2, the capacitance voltage Vc1 and the capacitance voltage Vc2 may be gradually separated from each other as indicated in a waveform Wbb. However, even if the capacitance voltage Vc1 and the capacitance voltage Vc2 are greatly separated from each other, the total capacitance voltage Vc1+Vc2 is constant, and does not fluctuate.

Figure 17:
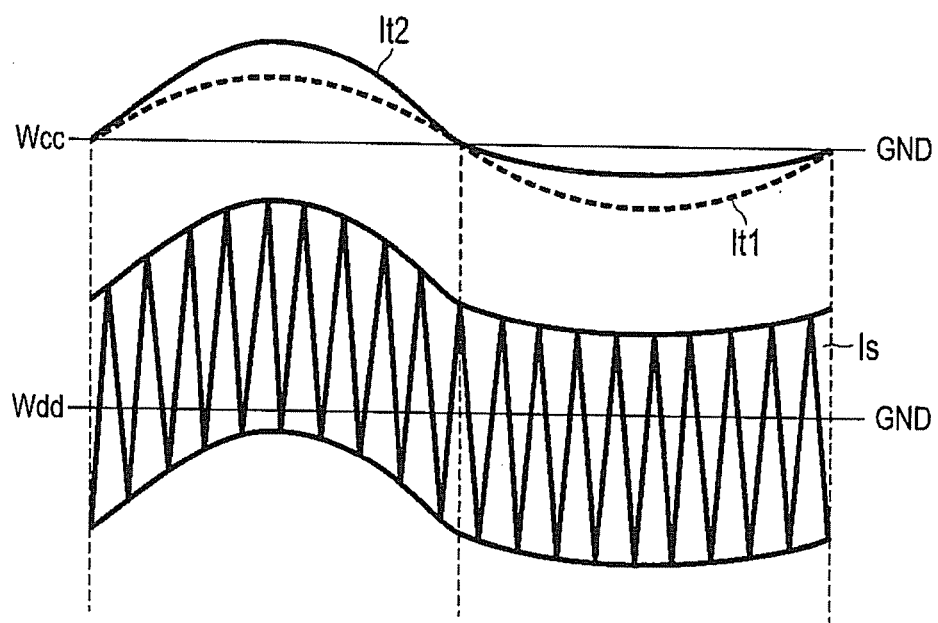
FIG. 17 is a diagram illustrating waveforms for describing a compensation process when imbalance between capacitance voltages of the first capacitor and the second capacitor is generated according to the sixth embodiment.

FIG. 17 is a diagram illustrating waveforms for describing an operation when imbalance is generated since the capacitance voltage Vc1 of the first capacitor C1 is small and the capacitance voltage Vc2 of the second capacitor C2 is great. In FIG. 17, a waveform Wcc indicates a target current value decided by the current target value decision unit 121.

A broken line in FIG. 17 is a target current value It1 when there are no fluctuations between the capacitance voltage Vc1 and the capacitance voltage Vc2, and a positive side and a negative side are symmetrical. A solid line is a target current value It2 when there is a relationship [Vc1<Vc2] between the capacitance voltage Vc1 and the capacitance voltage Vc2. That is, the solid line indicates a case in which the value Vc1−Vc2 obtained by subtracting the capacitance voltage Vc2 from the capacitance voltage Vc1 is negative. In this case, the imbalance detection unit 131 provides the negative imbalance signal (−) to the current target value decision unit 121. Accordingly, the current target value decision unit 121 multiplies the coefficient k by the coefficient h2. As a result, when the supply voltage Vin is positive, the wave motion of the target current value It2 becomes great. In contrary, when the supply voltage Vin is negative, the wave motion of the target current value It2 becomes small.

The envelope generation unit 122 generates the positive envelope +e by adding the width d to the signal corresponding to the current value It2 decided by the current target value decision unit 121. Additionally, the envelope generation unit 122 generates the negative envelope −e by subtracting the width d from the signal corresponding to the current value It2. Then, the envelope generation unit 122 supplies the signal corresponding to the positive envelope +e to the first input terminal of the upper determination unit 123, and supplies the signal corresponding to the negative envelope −e to the first input terminal of the lower determination unit 124.

Therefore, as illustrated in the waveform Wdd in FIG. 17, the width of the amplitude does not change. However, the circuit current Is in which wave motions when the supply voltage Vin is positive become different from those when the supply voltage Vin is negative flows to the load M. As a result, when the supply voltage Vin is positive, the electric charges which are charged in the first capacitor C1 increase, and when the supply voltage Vin is negative, the electric charges which are discharged from the second capacitor C2 increase. Therefore, the imbalance between the capacitance voltage Vc1 and the capacitance voltage Vc2 is resolved as a result.

Figure 18:
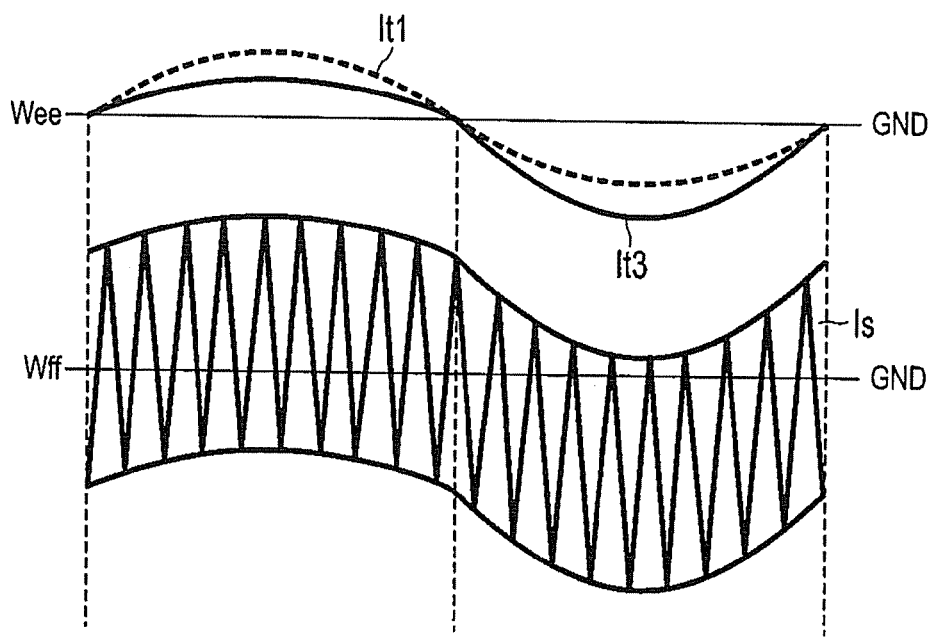
FIG. 18 is a diagram illustrating waveforms for describing a compensation process when imbalance between capacitance voltages of the first capacitor and the second capacitor is generated according to the sixth embodiment.

FIG. 18 is a diagram illustrating waveforms for describing the operation when the imbalance is generated since the capacitance voltage Vc1 of the first capacitor C1 is great, and the capacitance voltage Vc2 of the second capacitor C2 is small. In FIG. 18, a waveform Wee indicates the target current value defined by the current target value decision unit 121.

A broken line in FIG. 18 is the target current value It1 when there are no fluctuations between the capacitance voltage Vc1 and the capacitance voltage Vc2, and a positive side and a negative side are symmetrical. A solid line is a target current value It3 when there is a relationship [Vc1>Vc2] between the capacitance voltage Vc1 and the capacitance voltage Vc2. That is, the solid line indicates a case in which the value Vc1−Vc2 obtained by subtracting the capacitance voltage Vc2 from the capacitance voltage Vc1 is positive. In this case, the imbalance detection unit 131 provides the positive imbalance signal (+) to the current target value decision unit 121. Accordingly, the current target value decision unit 121 multiplies the coefficient k by the coefficient h1. As a result, when the supply voltage Vin is positive, the wave motion of the target current value It3 becomes small. In contrary, when the supply voltage Vin is negative, the wave motion of the target current value It3 becomes great.

The envelope generation unit 122 generates the positive envelope +e obtained by adding the width d to the signal corresponding to the current value It3 decided by the current target value decision unit 121. Additionally, the envelope generation unit 122 generates the negative envelope −e by subtracting the width d from the signal corresponding to the current value It2. Then, the envelope generation unit 122 supplies the signal corresponding to the positive envelope +e to the first input terminal of the upper determination unit 123 and supplies the signal corresponding to the negative envelope −e to the first input terminal of the lower determination unit 124.

Therefore, as illustrated in a waveform Wff in FIG. 18, the width of the amplitude does not change. However, the circuit current Is in which wave motions when the supply voltage Vin is positive become different from those when the supply voltage Vin is negative flows to the load M. As a result, when the supply voltage Vin is positive, the electric charges which are discharged from the first capacitor C1 increase, and when the supply voltage Vin is negative, the electric charges which are charged in the second capacitor C2 increase. Therefore, the imbalance between the capacitance voltage Vc1 and the capacitance voltage Vc2 is resolved as a result.

In this manner, according to the sixth embodiment, since the capacitance voltages Vc1 and Vc2 between the first capacitor C1 and the second capacitor C2 can be maintained in an appropriate scope, it is possible to prevent the breakage of the capacitor due to the voltage exceeding the withstand voltage, and the unstable circuit operation due to the lack of the voltage. Accordingly, since it is possible to maintain the balance by a comparatively simple control, this can be easily used in the industry.

In addition, according to the sixth embodiment, the imbalance detection unit 131 is provided to the controller 12-5 of the fifth embodiment, but the imbalance detection unit 131 may be provided to the controller 12-3 of the third embodiment or the controller 12-4 of the fourth embodiment. In this case, it is also possible to obtain the effect described in the sixth embodiment.

Seventh Embodiment

Subsequently, the seventh embodiment is described. As described in the third embodiment, when the input electric power is increased, the coefficient k is set to be great by the function of the capacitance voltage negative feedback unit 127. Then, the wave motion of the target current value It becomes great. Additionally, as described in the fourth embodiment, when the output electric power is decreased, a coefficient J is set to be small by the function of the load voltage negative feedback unit 129. Then, the interval between the positive envelope +e and the negative envelope −e becomes narrow.

Figure 20:
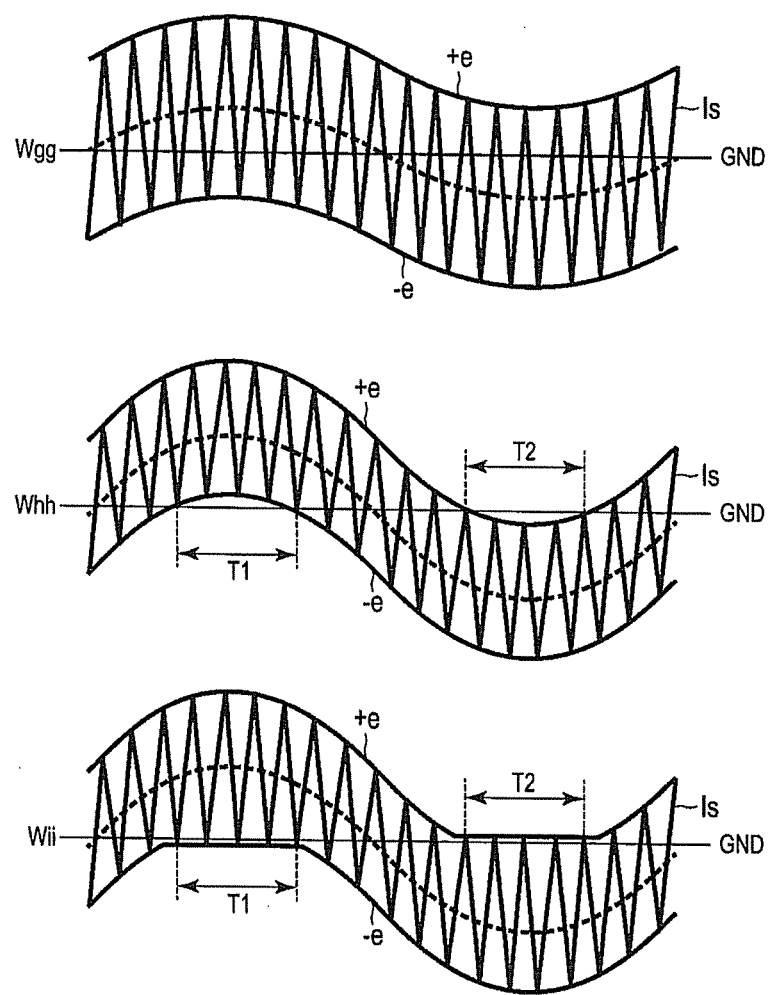
FIG. 20 is a diagram illustrating waveforms for describing an operation of the controller according to the seventh embodiment.

In FIG. 20, a waveform Wgg indicates the circuit current Is which is in a normal state. From the state, when the input electric power is increased and also the output electric power is decreased, the wave motion of the target current value It is increased by setting the coefficient k to be great and also the interval between the envelopes is narrowed by setting the coefficient J to be small, as described above. As a result, the envelope may enter a region in the opposite polarity.

In FIG. 20, the waveform Whh indicates the circuit current Is when the negative envelope −e enters a positive region in a section T1, and the positive envelope +e enters a negative region in a section T2. Positive and negative values are repeated in the circuit current Is according to the related art, but in this case, the circuit current Is continues to maintain a positive value in the section T1 and continues to maintain a negative value in the section T2. Accordingly, since the circuit current Is does not perform correct switching in the sections T1 and T2, electric power is excessively lost. According to the seventh embodiment, such a defect is resolved.

The power conversion apparatus 1-7 according to the seventh embodiment includes a power conversion circuit 11-7 and a controller 12-7 thereof. The power conversion circuit 11-7 has the same configuration as the power conversion circuit 11-6 according to the sixth embodiment.

Figure 19:
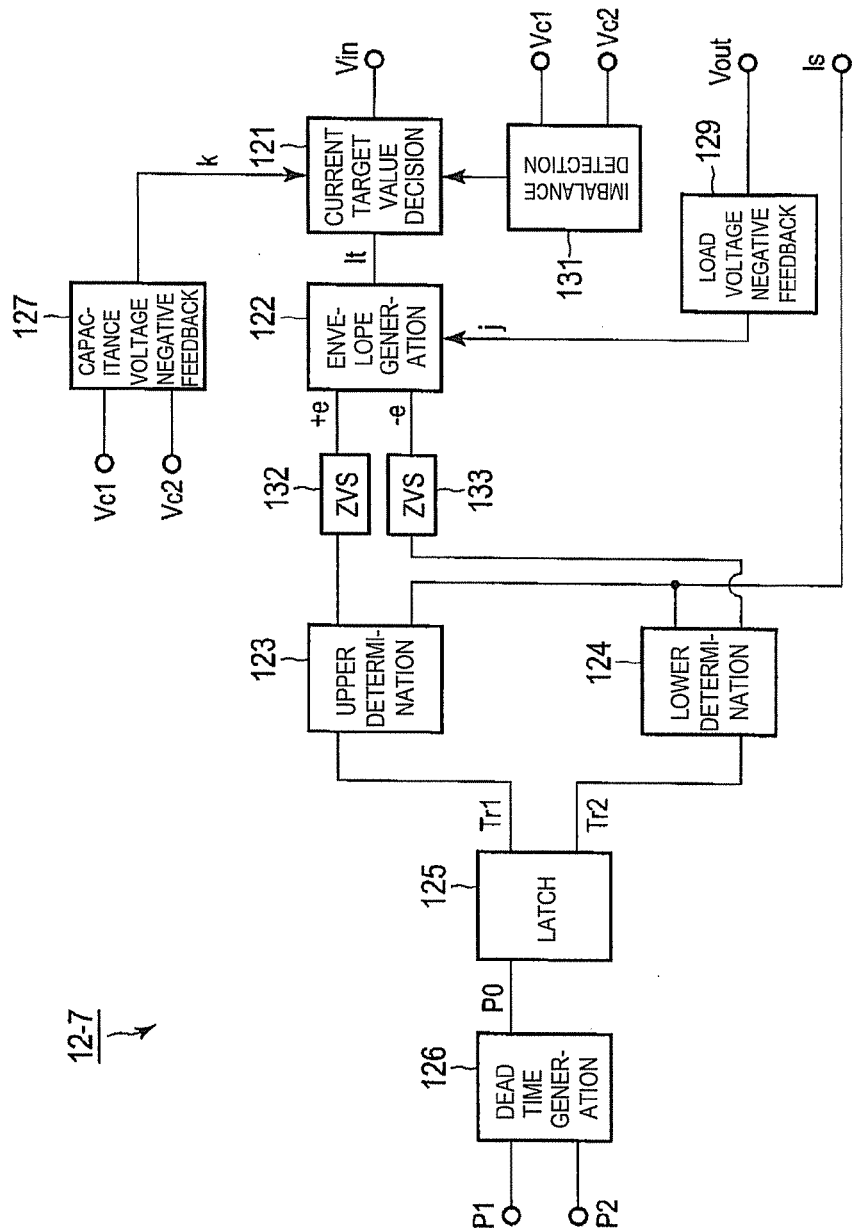
FIG. 19 is a block diagram illustrating a specific configuration of a controller according to a seventh embodiment.

FIG. 19 is a block diagram illustrating a specific configuration of the controller 12-7. The controller 12-7 includes first and second Zero Volt Switching (ZVS) compensation units 132 and 133, in addition to the current target value decision unit 121, the envelope generation unit 122, the upper determination unit 123, the lower determination unit 124, the latch circuit 125, the dead time generation unit 126, the capacitance voltage negative feedback unit 127, the load voltage negative feedback unit 129, and the imbalance detection unit 131.

The first ZVS compensation unit 132 receives the positive envelope +e generated by the envelope generation unit 122 as an input. Then, the first ZVS compensation unit 132 verifies whether the positive envelope +e is within a lower limit Amin in a positive region. If the positive envelope +e exceeds the lower limit Amin in the positive region, the first ZVS compensation unit 132 provides the positive envelope +e to the upper determination unit 123 without change. In contrary, if the positive envelope +e is less than the lower limit Amin, the first ZVS compensation unit 132 unconditionally replaces the positive envelope +e to the lower limit Amin. That is, the first ZVS compensation unit 132 provides the lower limit Amin to the upper determination unit 123 as the positive envelope +e (first compensation portion).

The second ZVS compensation unit 133 receives the negative envelope −e generated by the envelope generation unit 122 as an input. Then, the second ZVS compensation unit 133 verifies whether the negative envelope −e is within an upper limit Bmax in the negative region. If the negative envelope −e is less than the upper limit Bmax in the negative region, the second ZVS compensation unit 133 provides the negative envelope −e to the lower determination unit 124 without change. In contrary, if the negative envelope −e exceeds the upper limit Bmax, the second ZVS compensation unit 133 unconditionally replaces the negative envelope −e to the upper limit Bmax. That is, the second ZVS compensation unit 133 provides the upper limit Bmax to the lower determination unit 124 as the negative envelope −e (second compensation portion).

The operations of the current target value decision unit 121, the envelope generation unit 122, the capacitance voltage negative feedback unit 127, the load voltage negative feedback unit 129, and the imbalance detection unit 131 in the upstream of the first and second ZVS compensation units 132 and 133 and the upper determination unit 123, the lower determination unit 124, and the latch circuit 125 in the downstream are the same as those in the sixth embodiment.

When the circuit current Is indicated by the waveform Whh of FIG. 20 is obtained, a waveform Wii in FIG. 20 is the circuit current Is after the ZVS compensation is performed. As indicated by the waveform Wii, in the section T1 in which the negative envelope −e exceeds the negative upper limit Bmax, the second ZVS compensation unit 133 replaces the negative envelope −e to the negative upper limit Bmax. Therefore, the negative envelope −e does not enter the positive region.

In the same manner, in the section T2 in which the positive envelope +e is less than the negative lower limit Amin, the first ZVS compensation unit 132 replaces the positive envelope +e to the positive lower limit Amin. Therefore, the positive envelope +e does not enter the negative region.

Accordingly, since positive and negative values are always repeated in the circuit current Is, when the first switch S1 or the second switch S2 is switched on, the voltages on both ends of the switches S1 and S2 are always zero. Therefore, it is possible to obtain the switching operation in which the loss of the electric power is extremely small.

In addition, according to the seventh embodiment, the first and second ZVS compensation units 132 and 133 are provided to the controller 12-6 of the sixth embodiment, but the first and second ZVS compensation units 132 and 133 may be provided to the controller 12-3, 12-4, and 12-5 according to the third to fifth embodiments. In this case, it is also possible to obtain the effect described in the seventh embodiment.

Other Embodiments

The exemplary embodiments are not limited to the above.

For example, according to the embodiments, the single phase AC power supply E is used, but the AC power supply E is not limited to the single phase. It is possible to use a three phase AC power supply or a polyphase AC power supply of more than three phases.

Additionally, according to the embodiments, the high pass filter HPF is provided in a path that bypasses the AC power supply E and the low pass filter LPF, but the high pass filter HPF may be omitted.

Additionally, according to the embodiments, MOS-type field effect transistor is provided as an example of the first and second switches S1 and S2, but the first and second switches S1 and S2 are not limited thereto. For example, the first and second switches S1 and S2 may be bipolar transistors, or switches using semiconductor elements such as IGBT, GaN, and SiC. Otherwise, the first and second switches S1 and S2 may be formed by combining a mechanical switch such as a relay and a diode.

What is claimed is:

1. A power conversion apparatus comprising:
a power conversion circuit that includes a path configured to form a closed loop by connecting a first switch and a second switch in series, connecting a first capacitor and a second capacitor in series, and connecting the first switch and the second switch respectively to the first capacitor and the second capacitor, to connect a connection point between the first switch and the second switch and a connection point between the first capacitor and the second capacitor through a series circuit of an AC power supply, a low pass filter, an inductor, and a load, and to bypass the AC power supply and the low pass filter;
a circuit current detection portion configured to detect a circuit current that flows through the power conversion circuit;
a supply voltage detection portion configured to detect a voltage of the AC power supply; and
a control portion configured to output pulse signals for alternately opening and closing the first switch and the second switch to the first switch and the second switch based on the circuit current detected by the circuit current detection portion and a supply voltage detected by the supply voltage detection portion so that a current in which a high frequency component is mixed with a low frequency component of the AC power supply flows to the power conversion circuit.

2. The apparatus according to claim 1,
wherein the control portion includes:
a decision portion configured to decide a target value of the current flowing through the power conversion circuit based on a signal of the supply voltage detected by the supply voltage detection portion;
an envelope generation portion configured to generate positive and negative envelopes having a predetermined width maintained to be the target value of the current decided by the decision portion;
a determination portion configured to determine whether the circuit current detected by the circuit current detection portion is within a scope between the positive envelope and the negative envelope; and
a pulse generation portion configured to generate the pulse signal at a timing obtained by the determination portion which determines that the circuit current is out of the scope between the positive envelope and the negative envelope.

3. The apparatus according to claim 2, further comprising:
a first capacitance voltage detection portion configured to detect a potential difference generated between both ends of the first capacitor, as a first capacitance voltage; and
a second capacitance voltage detection portion configured to detect a potential difference generated between both ends of the second capacitor, as a second capacitance voltage,
wherein the control portion further includes a capacitance voltage negative feedback portion configured to adjust the target value of the current decided by the decision portion based on the first capacitance voltage and the second capacitance voltage.

4. The apparatus according to claim 3,
wherein the control portion further includes an imbalance detection portion configured to compare the first capacitance voltage and the second capacitance voltage, and
wherein when the imbalance detection portion detects that the first capacitance voltage is higher than the second capacitance voltage, the decision portion sets the target value of the current to be small if the supply voltage is positive and the target value of the current to be great if the supply voltage is negative, and when the imbalance detection portion detects that the first capacitance voltage is lower than the second capacitance voltage, the decision portion sets the target value of the current to be great if the supply voltage is positive and the target value of the current to be small if the supply voltage is negative.

5. The apparatus according to claim 3,
wherein the control portion further includes:
a first compensation portion configured to set a lower limit of the positive envelope generated by the envelope generation portion in a positive region, and replace a value of the positive envelope to the lower limit when the positive envelope is less than the lower limit, and
a second compensation portion configured to set an upper limit of the negative envelope generated by the envelope generation portion in a negative region, and replace a value of the negative envelope to the upper limit when the negative envelope exceeds the upper limit.

6. The apparatus according to claim 4,
wherein the control portion further includes:
a first compensation portion configured to set a lower limit of the positive envelope generated by the envelope generation portion in a positive region, and replace a value of the positive envelope to the lower limit when the positive envelope is less than the lower limit, and
a second compensation portion configured to set an upper limit of the negative envelope generated by the envelope generation portion in a negative region, and replace a value of the negative envelope to the upper limit when the negative envelope exceeds the upper limit.

* * * * *